(12) United States Patent
Aston

(10) Patent No.: US 11,568,144 B2
(45) Date of Patent: Jan. 31, 2023

(54) CALCULATING STRUCTURAL DIFFERENCES FROM BINARY DIFFERENCES IN PUBLISH SUBSCRIBE SYSTEM

(71) Applicant: PUSH TECHNOLOGY LIMITED, London (GB)

(72) Inventor: Philip Allan George Aston, Maidenhead (GB)

(73) Assignee: Push Technology Limited, London (GB)

( * ) Notice: Subject to any disclaimer, the term of this patent is extended or adjusted under 35 U.S.C. 154(b) by 271 days.

(21) Appl. No.: 17/083,628

(22) Filed: Oct. 29, 2020

(65) Prior Publication Data

US 2021/0049325 A1 Feb. 18, 2021

Related U.S. Application Data

(63) Continuation of application No. 16/087,999, filed as application No. PCT/IB2017/000397 on Mar. 27, 2017, now Pat. No. 10,853,573.

(Continued)

(51) Int. Cl.
*G06F 40/284* (2020.01)
*H04L 51/00* (2022.01)
(Continued)

(52) U.S. Cl.
CPC .......... *G06F 40/284* (2020.01); *G06F 40/169* (2020.01); *G06Q 10/107* (2013.01);
(Continued)

(58) Field of Classification Search
CPC . G06F 40/284; G06F 40/169; H04L 12/1804; H04L 67/55; H04L 51/216;
(Continued)

(56) References Cited

U.S. PATENT DOCUMENTS 6,671,757 B1  12/2003  Multer et al.
10,666,738 B2  5/2020  Aston et al.
(Continued)

FOREIGN PATENT DOCUMENTS

GB    2469695 A       10/2010
WO   WO 2014/072746 A1   5/2014

OTHER PUBLICATIONS

Bormann, C. et al., "Concise binary object representation (CBOR)," RFC 7049, Oct. 2013, pp. 1-55, Retrieved from the Internet <URL: https://www.rfc-editor.org/info/rfc7049>.

(Continued)

*Primary Examiner* — Brian L Albertalli
(74) *Attorney, Agent, or Firm* — Fenwick & West LLP

(57) ABSTRACT

A method for more efficient structural parsing of binary representations of text based objects within a data distribution system. Clients subscribe to a topic maintained by the data distribution system server that publishers can publish to. Clients receive an original binary representation of a text based object describing the state of the topic to which the client is subscribed. In response to the state of the topic changing at the data distribution system server, clients receive a binary delta representing the change of the state of the topic. Based on the received binary representation and the binary delta, clients calculate an updated binary representation of the text based object. Using the original binary representation, the updated binary representation, and the binary delta, the client generates a structural delta representing the structural differences between data structures of the original text based object and data structures of the updated text based object.

20 Claims, 13 Drawing Sheets

Related U.S. Application Data

(60) Provisional application No. 62/315,170, filed on Mar. 30, 2016, provisional application No. 62/314,642, filed on Mar. 29, 2016.

(51) Int. Cl.
| | |
|---|---|
| *G06Q 10/10* | (2012.01) |
| *G06F 40/169* | (2020.01) |
| *H04L 51/216* | (2022.01) |
| *H04L 67/55* | (2022.01) |
| *H04L 12/18* | (2006.01) |

(52) U.S. Cl.
CPC ........ *H04L 12/185* (2013.01); *H04L 12/1859* (2013.01); *H04L 51/00* (2013.01); *H04L 51/216* (2022.05); *H04L 67/55* (2022.05); *H04L 12/1804* (2013.01)

(58) Field of Classification Search
CPC ... H04L 51/00; H04L 12/1859; H04L 12/185; G06Q 10/107
See application file for complete search history.

(56) References Cited

U.S. PATENT DOCUMENTS

| 10,853,573 | B2 | 12/2020 | Aston |
|---|---|---|---|
| 2003/0217096 | A1 | 11/2003 | McKelvie et al. |
| 2006/0070083 | A1 | 3/2006 | Brunswig et al. |
| 2007/0043824 | A1 | 2/2007 | Fremantle |
| 2007/0088711 | A1 | 4/2007 | Craggs |
| 2008/0256138 | A1 | 10/2008 | Sim-Tang |
| 2010/0241583 | A1 | 9/2010 | Garza et al. |
| 2011/0307522 | A1 | 12/2011 | Futty et al. |
| 2012/0016979 | A1 | 1/2012 | Bortnikov et al. |
| 2013/0036098 | A1 | 2/2013 | Mutalik et al. |
| 2013/0159832 | A1 | 6/2013 | Ingargiola et al. |
| 2014/0324959 | A1 | 10/2014 | Hudson |
| 2014/0344314 | A1 | 11/2014 | Gray-Donald et al. |
| 2015/0195349 | A1 | 7/2015 | Cardamore et al. |
| 2016/0011741 | A1 | 4/2016 | Kamiya |
| 2016/0226976 | A1 | 8/2016 | Ciabarra et al. |
| 2016/0366141 | A1 | 12/2016 | Smith et al. |
| 2019/0014066 | A1 | 1/2019 | Baldwin et al. |

OTHER PUBLICATIONS

Myers, E. W., "AnO (ND) difference algorithm and its variations." Algorithmica, 1986, vol. 1, No. 1-4, pp. 251-266.

Oberstein, T., "The Web Application Messaging Protocol," Internet Engineering Task Force, Internet Society, Oct. 11, 2015, pp. 1-136.

PCT International Search Report and Written Opinion, PCT/IB2017/000400, dated Jul. 5, 2017, 19 Pages.

PCT International Search Report and Written Opinion, PCT/IB2017/000397, dated Jul. 5, 2017, 18 Pages.

Skjervold, E., et al., "Bandwidth Optimizations for Standards-Based Publish/Subscribe in Disadvantaged Grids," IEEE Military Communications Conference, Oct. 29, 2012, pp. 1-8, Norwegian Defense Research Establishment (FFI), Kjeller, Norway.

United States Office Action, U.S. Appl. No. 16/087,994, dated May 5, 2020, 21 pages.

White, G., et al., "Efficient XML Interchange Measurements Note," Internet Citation, Jul. 18, 2006, Retrieved on Nov. 15, 2007, Retrieved from the Internet: <URL: http://www.w3.org/TR/2006/WD-exi-measurements-20060718&- gt;>.

Percival, C., "Naíve Differences of Executable Code," Aug. 2003, pp. 1-3.

United States Office Action, U.S. Appl. No. 16/087,994, filed Oct. 8, 2020, 16 pages.

United States Office Action, U.S. Appl. No. 16/087,999, filed Mar. 30, 2020, eight pages.

CALCULATING STRUCTURAL DIFFERENCES FROM BINARY DIFFERENCES IN PUBLISH SUBSCRIBE SYSTEM

CROSS REFERENCE TO RELATED APPLICATIONS

This application is a continuation of U.S. application Ser. No. 16/087,999 filed Sep. 24, 2018 titled "Calculating Structural Differences From binary Differences in Publish Subscribe System" which is a 371 application of, and claims the benefit to, International Application No. PCT/IB2017/000397 filed Mar. 27, 2017 titled "Calculating Structural Differences From Binary Differences in Publish Subscribe System" and claims the benefit of U.S. Provisional Application No. 62/314,642 titled "Efficient Broadcast Using Binary Delta Streams" filed Mar. 29, 2016 and U.S. Provisional Application No. 62/315,170 titled "Calculating Structural Differences From Binary Differences" filed Mar. 30, 2016, both of which are incorporated herein by reference in their entirety.

FIELD OF ART

This disclosure generally relates to the field of data distribution, and more specifically, to publishing updates to topic information to subscribers of the topic information.

BACKGROUND

The increased demand for data means that business systems and applications must exchange data efficiently and intelligently at scale with devices, browsers, and other applications over the Internet. To meet this increased demand for data, some data distribution platforms employ a publish-subscribe model in which senders of messages, called publishers, publish messages into classes (e.g., topics) without knowledge of subscribers who may receive the messages. Subscribers in a topic-based publish-subscribe system will receive all messages published to the topics to which they subscribe, and all subscribers to a topic will receive the same messages. Publishers establish a session with the server to create and maintain topics and clients establish a session with the server to consume data published by the publishers. Some topics have values that change incrementally. For example, a topic with a value representing a person may be updated to change the email address, without affecting other fields such as the contact address. For such a topic, it is more efficient to notify clients of the differences between the old and the new value, rather than providing the complete new value.

SUMMARY

In one embodiment a method of efficient structural parsing is described. A plurality of topics is maintained by a data distribution system server. A client subscribes to a topic of the plurality of topics. A first binary representation of a first text based object which describes a first state of the topic is received. In response to a change in the topic being published to the distribution system server by a publisher, a binary delta from the data distribution system server is received. The binary delta represents a difference between the first binary representation of the topic and a second binary representation of a second text based object describing a second state of the topic. A structural delta from the binary delta is generated representing a structural difference between data structures of the first text based object and data structures of the second text based object.

In one embodiment, the second binary representation is calculated from the binary delta and the first binary value and the structural delta is generated from the first binary representation, the second binary representation and the binary delta. A first set of tokens indicating a structure type is determined from the first binary representation and a second set of tokens indicating a structure type is determined from the second binary representation. At least one of the first set of tokens is parsed by an old span parser and at least one of the second set of tokens is parsed by the new span parser to determine the structural delta. Elements of the second text based object are displayed corresponding to the structural difference of the structural delta.

In one embodiment, the structural delta includes at least one remove structure edit operation that indicates a portion of the first text based object to be removed. Alternatively or additionally, the structural delta includes at least one insert structural edit that indicates a value to be added to the first text based object.

In one embodiment, the number of tokens parsed by at least one of the old span parser and new span parser is based on bytes in the binary delta.

In one embodiment, determining the structural delta is based at least in part on a first set of bytes associated with tokens parsed by the old span parser, a second set of bytes associated with tokens parsed by the new span parser, the position of the byte in the first binary representation associated with the parsed tokens, the position of the byte in the second binary representation associated with the parsed tokens, and the structure type of the parsed tokens.

In one embodiment, the last parsed token of the first set of tokens advances the old span parser such that the old span parser is misaligned with the last parsed token of the second set of tokens and the new span parser. In response to the misalignment, at least one structural edit is generated for the structural delta.

In one embodiment, the last parsed token of the second set of tokens advances the new span parser such that the new span parser is misaligned with the last parsed token of the first set of tokens and the old span parser. In response to the misalignment, at least one structural edit is generated for the structural delta.

In one embodiment to generate the structural delta, a plurality of individual structural edit operations are added to the structural delta and false positives are removed from the added structural edits operation. In one embodiment, a non-transitory computer readable medium stores instructions for efficient structural parsing. The instructions are executed by a processor and cause the processor to implement the method described herein.

The figures depict embodiments for purposes of illustration only. One skilled in the art will readily recognize from the following description that alternative embodiments of the structures and methods illustrated herein may be employed without departing from the principles of the invention described herein.

DETAILED DESCRIPTION

I. Data Distribution System Architecture

Figure 1:
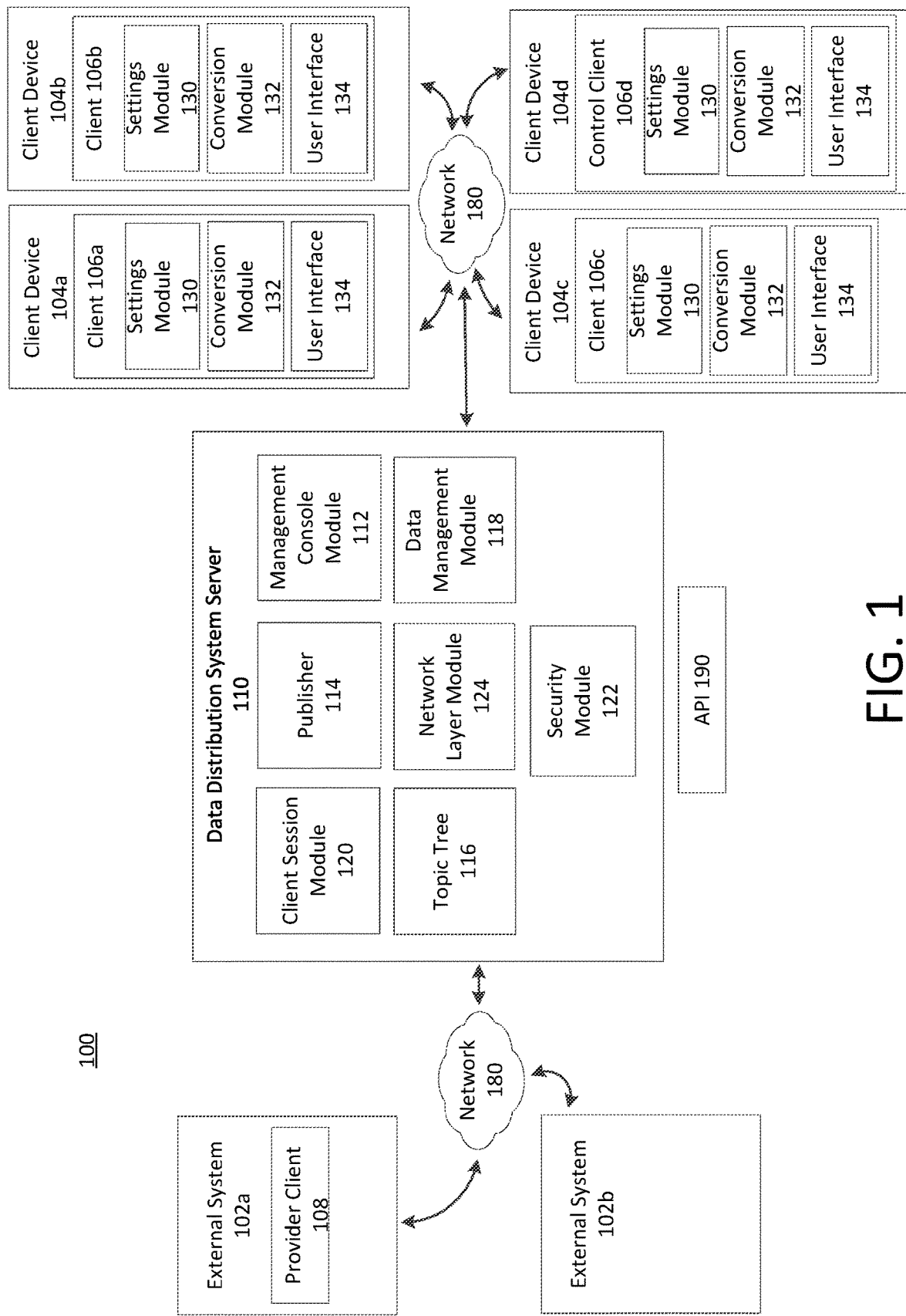
FIG. 1 is a block diagram of a data distribution system, according to one embodiment.

FIG. 1 is a block diagram of a data distribution system 100, according to one embodiment. The data distribution system 100 includes a data distribution system server 110, external systems 102, and client devices 104.

One or more external systems 102 interact with the data distribution system server 110 to distribute data to multiple client applications over a network. An external system 102 may be a server associated with a data source for distribution via the data distribution system server 110. Example data sources include entities such as a stock exchange, an online game provider, a media outlet, or other source that distributes topical data to users over a network, such as the Internet.

The external system 102 communicates with the data distribution system server via a hosted application called a "publisher 114," which enables the external system to create and maintain topics on the data distribution system server 110 for distribution to multiple clients 104a-c. Alternatively, publishers 114 may operate as a separate process external to the data distribution system server 110, in which case the publisher 114 is referred to as a provider client 108. For example, the publisher 114 may be located within one of the external systems 102 instead of the data distribution system server.

The client devices 104 communicate with the data distribution system server 110 through a network 180. The client devices include clients 106. A client 106 can be an application that communicates with the data distribution system server 110 using one or more specified client protocols. Example client protocols include WebSocket (WS) and Hypertext Transfer Protocol (HTTP). Some clients connect to the data distribution system server to subscribe to topics and receive message data on those topics. Other clients 106, which have different permissions, perform control actions such as creating and updating topics or handling events (e.g. control client 106d). The category of client depends on the language of the application programming interface (API) and libraries used to implement it. Example APIs include JavaScript Unified API, Java Unified API, .NET Unified API, C Unified API, iOS Classic API, and Android Classic API. Example client libraries include Flex and JavaScript.

The clients 106 can include web clients 106a, mobile clients 106b, and enterprise clients 106c. Web clients 106a can include browser applications that use JavaScript, ActionScript, or Silverlight APIs. Enterprise clients 106b may be any application connecting to the data distribution system server 110 over a data distribution system server protocol for Transmission Control Protocol (TCP) over the Internet or an intranet, extranet using Java, .Net, or C APIs. Mobile clients 106c may be mobile applications that interact with the data distribution system server 110 using iOS or Android APIs.

Generally, clients 106 interact with the data distribution system server 110 using an API 190. The API 190 may include the libraries appropriate to the platform executing the client application. The category of client 106 depends on the language of the API and libraries used to implement it. Clients 106 may be implemented in one of a number of languages and use variety of protocols to communicate with the server 110. Clients 106 may perform different types of actions depending on their permissions and the capabilities of the API they use.

Clients 106 used by data consumers typically subscribe to topics and receive the updates that are published to these topics from the data distribution system server 110. Clients used by data providers (hereafter, provider clients 108) typically create, manage, and update topics. These provider clients 108 also take responsibility for control functions, for example authenticating and managing other client sessions. Provider clients 108 may be a client within the external system 102.

Additionally, clients 106 can include a settings module 130, a conversion module 132, and a user interface 134. The settings module 130 can include client settings governing connections from the client 106 to the data distribution system server 110. The settings module 130 can manage and set permissions for actions that the client 106 or data distribution system server 110 can take when connected to one another via the network 180. Further, the settings module 130 can manage to which topics the client 106 is allowed to subscribe or which push notifications the client can receive from the data distribution system server 110. The conversion module 132 performs operations on the data received by the client. Example operations include structural conflation, merging, calculating differences in topic values, constructing updated topic values from topic deltas, and calculating structural deltas. The user interface 134, e.g. a graphical user interface, allows a user of the client device to interact with the client 106. In particular, the user interface 134 is configured to display updated structures of subscribed topics as the client 106 receives binary deltas from the data distribution system server 110 and calculates structural deltas.

The data distribution system server 110 hosts publisher applications 114 and a topic tree 116, manages connections from clients 106, sessions from clients 106, and pushes data to the clients 106 through message queues. The data distribution system server 110 may be a standalone server or part of a cluster of servers to provide a scalable enterprise data distribution solution. The data distribution system server 110 pushes (streams) and receives data and events, in real-time, both to and from clients 106. The data distribution system server 110 includes a high performance network layer module 124, security enforcement module 122, client session module 120, topic tree 116, data management module 118, publishers 114, and a management console 112.

The high performance network layer 124 handles a high number of concurrent connections without the need for separate threads. Connectors handle connections from many different types of clients 106 and for various protocols. Connectors may be configured to listen on different ports. Multiple clients 106 may connect to a single port.

The security enforcement module 122 authenticates all connections from clients and manages authorization and setting permissions for actions that those clients 106 can take when they are connected to the data distribution system sever 110.

The client sessions module 120 manages the sessions for all of the clients 106 that connect to the data distribution system server system 110. Additionally, the client session module 120 stores information about each client 106 and topic subscription information about the client's subscriptions to topics, such as by storing a list of topic selections. If a client 106 disconnects, it can reconnect to the same session within a specified time period using the information stored in the client session module 120.

In one embodiment, the client sessions module 120 manages which clients are 'in-session' or 'out-of-session.' 'In-session' clients are clients that are connected to the data distribution system server, and 'out-of-session' clients are clients that are disconnected from the data distribution system server. In this embodiment, 'in-session' clients are clients that automatically receive pushes of updated topic tree 116 values from the publisher 114, and 'out-of-session' clients are clients that do not automatically receive pushes of updated topic tree 116 values from the publisher 114. Generally, clients that are subscribed to a topic are automatically in-session for the subscribed topic.

The data management module 118 performs operations on the data to more efficiently deliver it to clients 106. Example operations include structural conflation, merging, calculating differences in topic values, and replacing data to ensure that the latest data is received by the client 106.

The management console module 112 may operate as an optional publisher that is deployed by default. The management console module 112 may be used to monitor the operations of the data distribution system server 110 through a web browser and to stop and start publishers within the data distribution system server 110.

Publishers 114 can be components hosted within the data distribution system server 110 that manage the data for one or more topics and publish messages to any clients 106 that subscribe to the topics that the publisher 114 manages. In one example, publishers are written using the Java API and extend the issued Publisher class and implement various methods to provide the publisher functionality. A publisher 114 maintains its own data model. The publisher initializes its data as it starts and updates it as a result of external events, (e.g. an external system 102 changing the value of a topic within the topic tree 116). When a client 106 first subscribes to a topic the publisher 114 provides the client 106 with a snapshot of the current state of the data relating to that topic (e.g. transmitting the current topic value from the topic tree 116 to the subscribing client 106). This is referred to as a "topic load." A client 106 can also request the current state of a topic, even if not subscribed to it, using the "fetch" command. Alternatively, the publisher 114 can also topic load a client device in response to a client becoming in-session (e.g. the client 106 establishes a high quality connection to the data distribution system server 110).

A publisher 114 maintains any changes to its topic data state and publishes those changes to the topic as delta messages that include binary deltas. In one embodiment, this results in the message being sent to every client 106 that is subscribed to the topic. Publishers 114 can send messages to individual clients 106 (i.e. notify clients) or to groups of clients and can receive messages from clients 106. Under certain operating conditions, the publisher 114 does not need to know or keep track of the clients 106 subscribed to its topics. Publishers 114 own the topics they create. Ownership of a topic is used to determine which publisher receives a message from a client, deals with subscription, and, or creates dynamic topics. Publishers 114 hosted in the data distribution system server 110 may act as client applications 106 to other data distribution system servers. A publisher may do this by subscribing to topics on the other servers to create a distributed architecture. Publishers can also store previous topic values and binary deltas for each topic. The stored topic values can be in any format and can be accessed at any time to calculate binary deltas. The stored values can be associated with a client 106.

II. Topic Trees, Topic Values and Subscription Services

The topic tree 116 represents a model of the organizational structure of the topics available to be published to clients and which the clients can subscribe to. The topic tree is arranged hierarchically and comprised of top-level topics with subordinate topics underneath those top-level topics. These subordinate topics can themselves have subordinate topics. A topic of any type can be bound to any node of the topic tree. The topic tree 116 may be maintained by the publisher 114, the client sessions module 120, or by other software within the data distribution system server 110.

Figure 2:
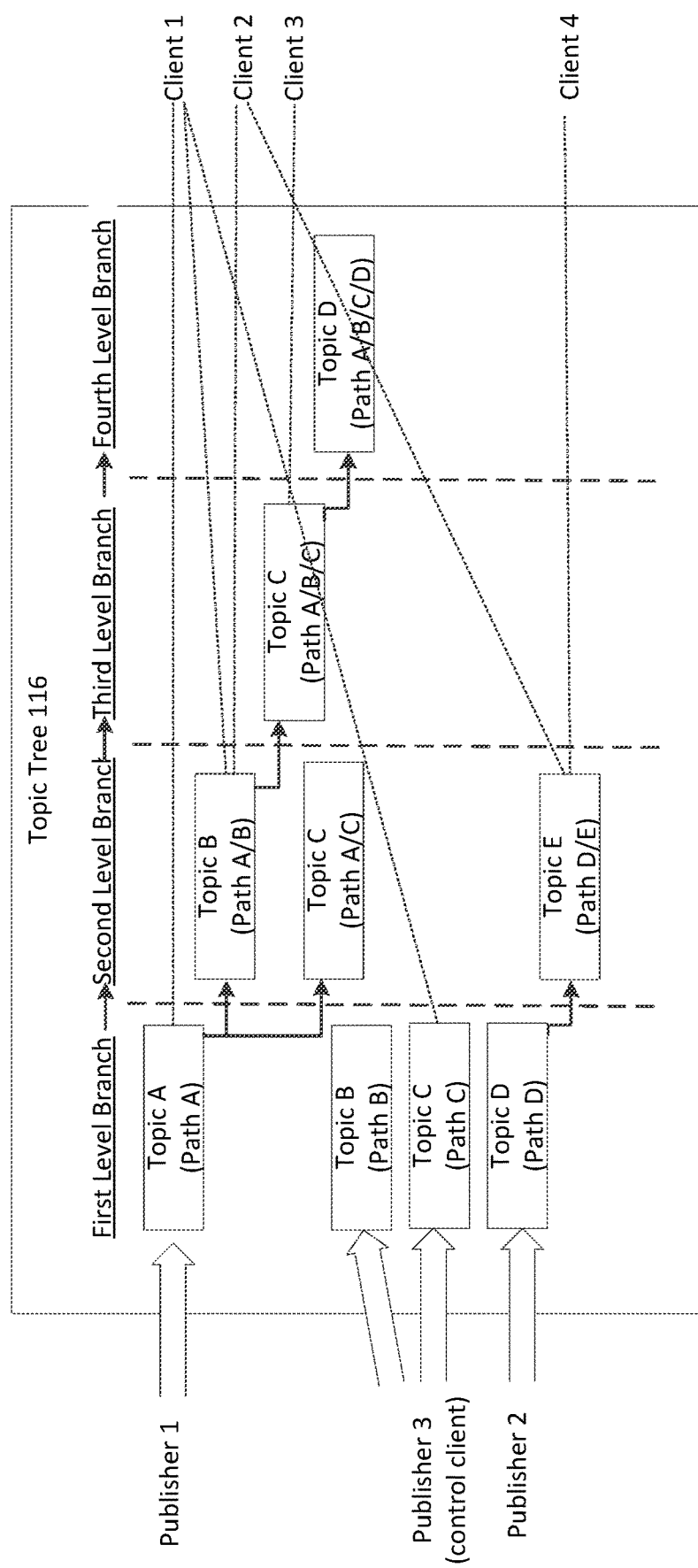
FIG. 2 is a block diagram illustrating components of the data distribution system server, from FIG. 1, according to one embodiment.

FIG. 2 is a diagram illustrating a topic tree 116, and comprised of logical connections between Publishers and clients based on topics, according to one embodiment. In one example, topics may be arranged in a tree structure. Topic A, B, C and D are the highest level of the tree structure. Topics B and C are beneath topic A in the topic tree and topic E is beneath topic D in the topic tree in the second level of the tree structure. Topic C is beneath topic B in the third level of the tree structure. Topic D is beneath topic C in the fourth level of the tree structure. The location of the topic in the topic tree is described by the topic path. The topic path includes all the topics above it in the topic tree in an order separated by the slash character (/). For example, the path to topic B is A, B and the path to topic E is D, E. The topic tree may include any number of topics, and the topic tree shown in FIG. 2 is just one example of a topic tree.

Clients 106 and publishers 114 are loosely coupled through logical links representing the topics. A publisher 114 publishes messages to a topic and a client 106 subscribes to a topic and receives its messages. For example, Publisher 1 can publish to topic A or any topic subordinate to topic A. Publisher 2 can publish to topic D or any topic subordinate to topic D. Publisher 3 can also publish to topic B or C or any topic subordinate to topic B or C.

Client 1 is subscribed to receive messages from Topic A at path A, topic B at path A/B and Topic C at path C. Client 2 is subscribed to receive messages from Topic B at path A/B and Topic E at path D/E. Client 3 is subscribed to receive messages from Topic B at path A/B. Client 4 is subscribed to receive messages from Topic E at path D/E. In some embodiments, clients subscribing to a topic at the first-level of the topic tree can automatically subscribe to all subordinate topics.

A topic path may also be used by a client 106 to send messages to the publisher 104 that receives messages on that topic path. In some embodiments, the client is not aware of the publisher and aware of the topic path. In other embodiments, the client is aware of the publishers and the topic paths.

Figure 3:
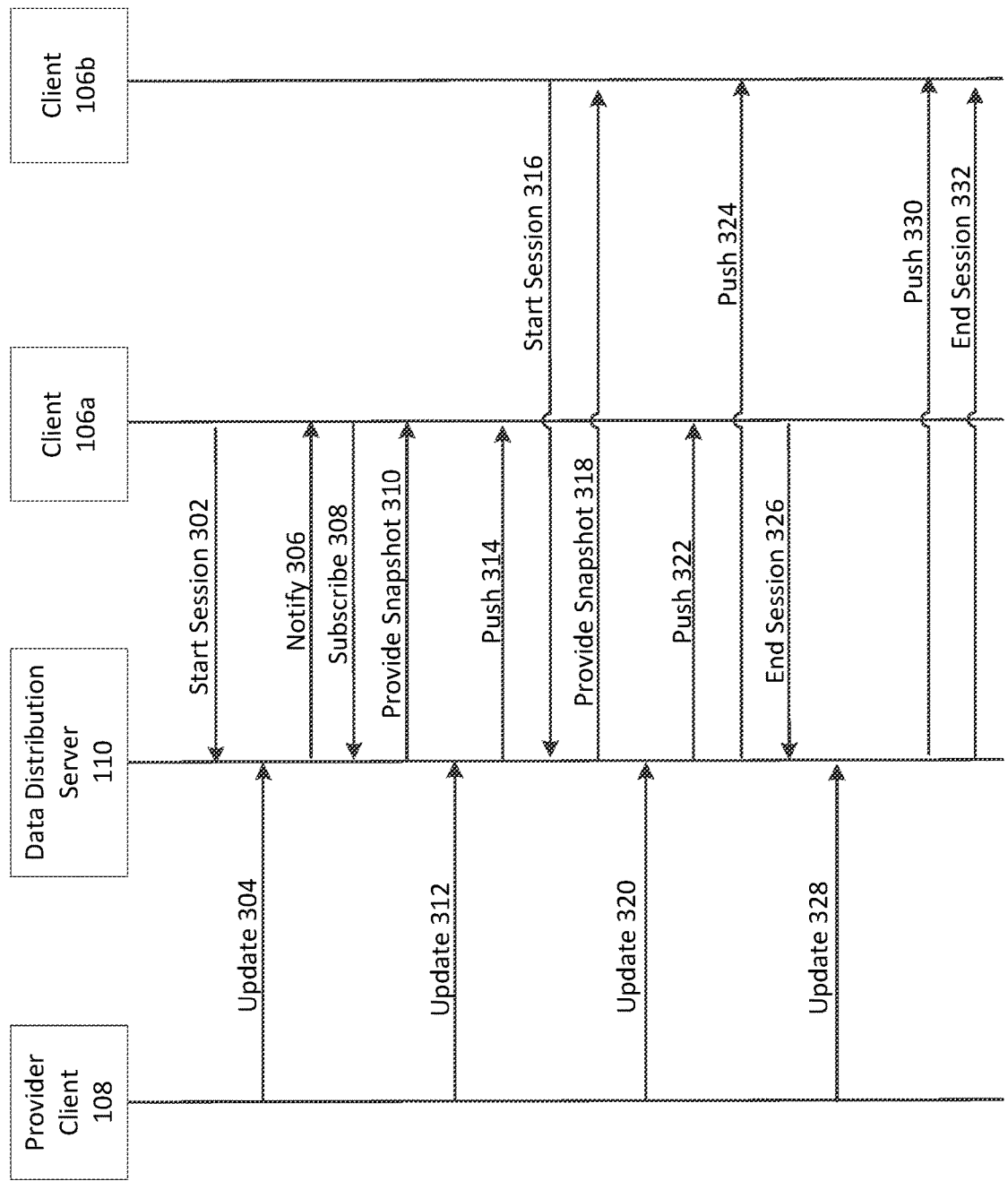
FIG. 3 is an interaction diagram illustrating the interactions between a provider client, clients, and the data distribution system server, according to one embodiment.

Topics are created in the data distribution system server 110 by publishers 114. As shown in FIG. 3, the topic names are A, B, C, D, and E. In one embodiment, each topic name can appear in multiple locations within the topic tree. For example, topic D appears one time in the first level of the tree, and again in the fourth level of the tree. In one embodiment, each topic can have a unique name within the data distribution system server 110.

Each topic in the topic tree has a topic value, which may also be referred to as a topic data state (i.e. a snapshot of the current state of data relating to that topic). A text based data object can be used to hold the data state of the topic. The text based data object includes human readable text that describes the data state of the topic. In one embodiment, the text based data object is in the JavaScript Object Notation (JSON) data interchange format. JSON is a self-describing, schema-less approach for objects and their related information. Each JSON object includes data structures defined by the JSON format, such as attribute-value pairs and arrays. The state of the topic can be captured in the data structures of the JSON object. The examples described herein will use a JSON object as an example of a text based data object. However in other embodiments, data formats other than JSON are possible.

A binary value representation of the text based data object is typically stored at the server 110 instead of storing the text based data object. In some embodiments, the text based data object may be stored by the data management module 118, which then converts the text based data object into its binary value representation when communicating with clients. In one embodiment, the binary representation is generated by encoding a JSON object into a concise binary object representation (CBOR) data format. The resulting binary value representation is a sequence of individual binary digits.

Further, the client sessions module 120 maintains subscription information about the topics each client 106 is subscribed to. For each client 106 the subscription information includes a list of topic selections. A topic selection includes data that identifies a subset of the topic tree 116 and whether the client 106 is subscribed to that subset of the topic tree 116. Each topic selection includes a topic selector which is hierarchical wild-card expression that identifies a subset of the topic tree. The data distribution system server 110 uses topic selectors to subscribe client sessions to appropriate topics. Each topic selection includes a subscription operation type value indicating whether the topic selector is subscribing to or unsubscribing from the topic tree.

A client session uses subscribe and unsubscribe operations to change its topic selections. Each operation adds a new topic selector to the client's topic selections. When a new topic is added by the publisher 114, the topic's path is evaluated against every client session's unique topic selections.

III. Delta Streams

For a particular topic, initial communication between the data distribution system server and a client involves transmission of the topic's value. In some embodiments, the initial communication can occur as a result of a client device subscribing to a topic of the topic tree. If the topic value later changes, the data distribution system server 110 and data management module 118 calculates the differences (i.e. a delta) and, if it would require fewer bytes to transmit, sends the delta to the client rather than the new value of the topic. The client 106 combines the current on-client topic value with the received delta to calculate the new value.

For a sequence of partial incremental changes to a value, delta streams may greatly reduce the bandwidth and transmission latency costs to send each change to a client. Further, if many clients are subscribed to the same sequence of updates, the server-side cost of calculating a delta is amortized across all of the subscribers.

As an example of the computational and bandwidth reductions of delta streams, FIG. 3 is an interaction diagram 300 describing a delta stream within the data distribution system 100 including a provider client 108, a data distribution system server 110, and clients 106a and 106b. In this configuration, the client sessions module 120 is configured to provide updates to clients 106 that are in-session.

To begin, the client 106a starts a session 302 with the data distribution system server 110. The client 106a transmits the start session request to the data distribution system server 100 via the network 180. In some embodiments, in response to receiving the start session request the data distribution system server 110 can provide a snapshot of the current topic value of the client 106a. This functions similarly to a fetch.

The provider client 108 updates 304 (i.e. changes) a topic state of a topic within the topic tree 116 via the network 180. The publisher 114 can publish the received topic state to the topic tree 116, such as by publishing the new binary representation to the topic tree 116. The data distribution system server 110 can, optionally, notify 304 the subscribed client 106a that the current topic state of the subscribed topic has been updated.

To begin a client 106a subscribes 308 to a topic of the topic tree 116 at the data distribution system server 110 via the network 180 by sending a subscription request to the data distribution system server 110. Generally, the subscription provides 310 the client with a snapshot of the current topic value of the client.

The provider client 108 incrementally changes the topic value and updates 312 the topic value by transmitting the current binary representation of the topic to the data distribution system server 110 via the network 180. The data management module 118 calculates the binary delta between the previous binary value representation of a previous JSON object and a new binary value representation of the new JSON object. The publisher 114 of can publish the current binary representation for the topic to the topic tree 116 using the delta. The data distribution system server 110 pushes 314 (i.e. transmits) the binary delta of the subscribed topic to the in-session client 106a.

At this point, a one to one correspondence between delta calculations and clients 106 has occurred. To move forward, a second client 106b (or multiple clients 106) previously subscribed to the topic transmits a start session 316 request to the data distribution system server 110. Optionally, the data distribution system server provides 318 a snapshot of the current topic state to the client 106b. Again, this operation can be similar to a fetch.

The provider client 108 again updates 320 the current topic state of the subscribed topic to a new topic state which the publisher 114 publishes to the topic tree 116. The data management module 118 calculates a single binary delta between the current topic state and the new topic state and pushes 322 and 324 the binary delta to the in-session clients 106a and 106b. Here, a single binary delta is transmitted or broadcasted to a large number of devices. The delta broadcast yields savings in computational power and bandwidth that scales with the number of in-session clients.

The first client 106a transmits an end session 326 request to the data distribution system server 110. After this, the provider client again updates 328 the topic state. As the first client 106a is out-of-session it no longer receives an updated value of the topic The data distribution system server pushes 330 a binary delta to the in-session client 106b. To conclude, the data distribution system server 100 transmits an end session 332 request to the client 106b.

As described above, in one embodiment, all all deltas are automatically pushed to the subscribed clients. In this embodiment, snapshots of the current state of a topic are provided when the client subscribes to a topic. Generally, pushes of the topic values only occur to client devices that are subscribed and in-session. If a client device is temporarily disconnected the data distribution system server can queue deltas to push to the subscribed client and automatically pushes the deltas when the client re-connects.

III.A Binary Delta Streams

The data distribution system server 110 supports a variety of data formats that can be used for delta broadcasting. Example data formats include JavaScript Object Notation (JSON) data interchange format, and simple binary values, all of which can benefit from delta stream transmission. The data distribution system server observes the various data formats and defines a binary representation of a value of a topic within the topic tree. In an implementation, the data distribution system server 110 creates a generalized binary delta stream based on calculating differences between the observed binary representations, such as between an old binary value representation and a new binary value representation. The calculated differences are encapsulated in a compact form referred to herein as a "binary delta."

The data distribution system server 110 overcomes the issues of previous implementations of updating topics by storing, receiving, and transmitting topic values (i.e. topic state) in their binary form. Binary deltas may be calculated directly from the binary representation of two topic values, without the need for computationally expensive structural parsing. Similarly, the recipient (e.g. a client 106) of a binary delta may calculate a new value without the need to parse the message.

III.B Benefits for JSON Transmission

JSON is a popular data format for transmitting, storing, and representing data across networks. However, transmitting JSON objects can require a large amount of bandwidth to transmit over a network. As an example of a topic state object, the following document in its JSON format is expensive to transmit to clients {"maps": ["and", "lists"]// 31 chars This JSON data object includes a name/value pair that describes the data state of a topic. "maps" is the name, while "and" and "lists" are the values associated with the name.

The bandwidth cost can be due to white space formatting (optionally removable at the cost of readability), redundant delimiters, and decimal representation of numbers. Data savings can be achieved (around 20%) through the use of a more efficient binary representation.

The data distribution system server 110 and data management module 118 use Concise Binary Object Representation (CBOR) data format to transmit a binary representation of a JSON formatted data object to clients.

Binary delta streams provide more significant savings. Suppose a minor change to the above document is made, changing one of the elements in the array of the document as follows:

{"maps": ["or', "lists"]// 30 chars

To send the changed value would cost around 30 bytes (i.e. nearly the full JSON document). The binary delta that the data distribution system server 110 and data management module 118 calculates for the above JSON values is:

---
// match 0,7; insert 626F72, match 11,8
// 000743626F720B08 // 8 bytes
---

The eight bytes of the binary delta are less expensive to transmit than the JSON document (i.e. JSON object) of the updated topic value. Such changes to a field value, but not a field name is typical within JSON objects. The savings of transmitting binary deltas rather than entire JSON documents become more dramatic when changing a single field value in larger JSON documents with more than one field.

Figure 4:
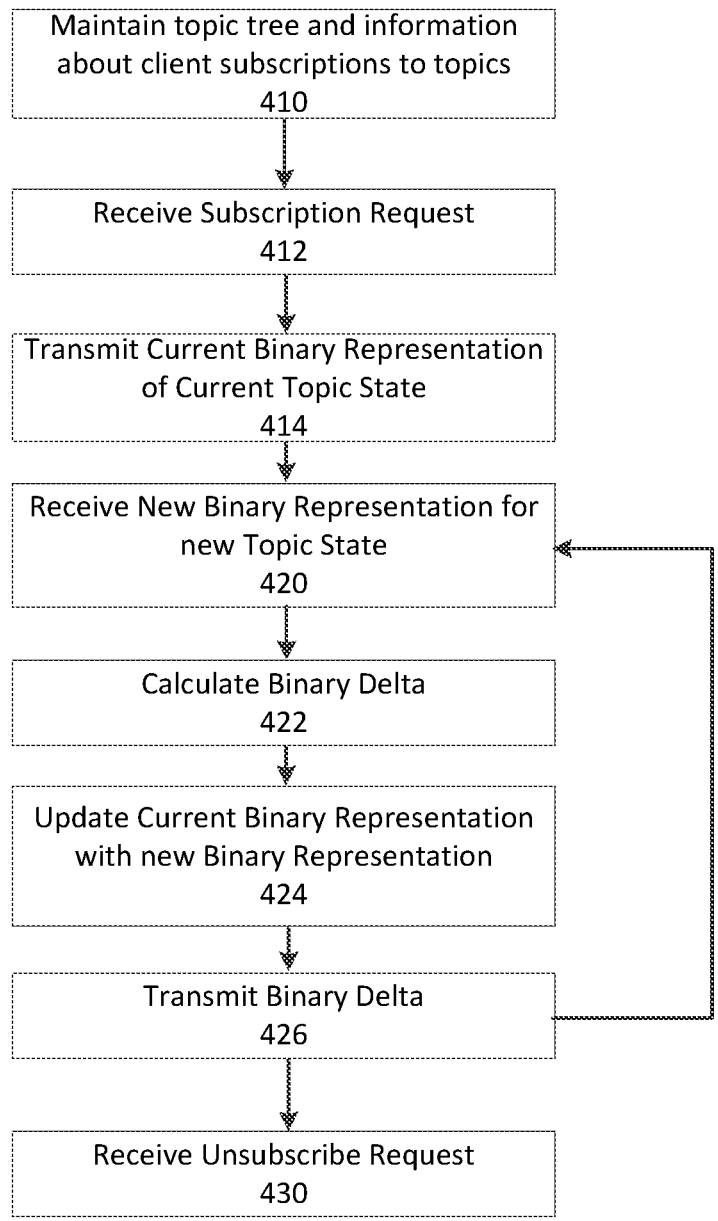
FIG. 4 is a flow chart illustrating a method for continuous transmission of binary deltas to subscribed client devices, according to one example embodiment.

To illustrate this, FIG. 4 is a process flow for the data distribution system server within the data distribution environment of FIG. 1 participating in a delta stream similar to FIG. 3. More specifically, the deltas of FIG. 4 are binary deltas, each binary delta associated with a change between two binary representations of JSON objects. In the embodiment of FIG. 4, the data distribution system server 110 automatically transmits binary deltas of topics to clients 106 subscribed to the topic.

Initially, the data distribution system server 110 maintains 410 a topic tree and information about client subscriptions to topics. Each topic of the topic tree can include the current binary representation of a JSON data object. Further, in one embodiment, the information about the client subscriptions to topics can include which clients 106 are in-session, which clients are out-of-session.

The data distribution system server can receive 412 a subscription request from at least one client 106 for subscribing to a topic of the topic tree 116. The publisher 114 transmits 414 the current binary representation of the subscribed topic to the client 106. In another embodiment, the publisher 114 transmits a binary delta that allows the client 106 to update a previous binary value representation to the current binary value representation, or the publisher 114 transmits the JSON object for the topic.

The data distribution system server can receive 420 a new binary representation of a new topic state of a topic from the provider client 108. Following this, the data management module calculates 422 the binary delta between the received new binary representation and the current binary representation of the current topic state. After the binary delta is calculated, the data distribution system server updates 424 the current binary value representation of topic state with the new binary value representation of the topic state in the topic tree. In some configurations, the replaced binary value representation, the binary delta, and the new binary value representation can be stored by the publisher 114. A more detailed description of the calculation of binary deltas is provided in the section of the description titled "IIIC. Specific Binary Delta Calculation Example."

The publisher 114 transmits 426 the binary delta to the subscribed clients 106 via the network 180. In some configurations, the transmitted binary delta and the current binary value representation of the topic state can be stored by the publisher 114. This allows the data distribution system 110 to monitor the most recently transmitted information to each client 106 for more efficient calculations of binary deltas. For example, rather than providing a snapshot of the current binary value representation of the topic state at the client by sending the entire binary value representation of the topic state, the publisher 114 can access the most recently transmitted binary value representation of the topic state and calculate a binary delta with the data management module 118 to update the client 106 to the current binary value representation of the topic state.

The data distribution system server 110 can receive 430 an unsubscribe request from a client 106. The unsubscribe request unsubscribes the client 106 from the topic of the topic tree. The data distribution system server 110 no longer sends notifications of topic value changes to the unsubscribed client.

As discussed with FIG. 3, in one embodiment, the data distribution system server 110 only sends binary deltas to clients that are in-session. The data distribution system server 110 can receive a start session request to place the client in-session or an end-session request to place the client out-of-session. In response to receiving the start session request from the client, the data distribution system server can provide the client with a snapshot of the current topic state. In another embodiment, a client being in-session can be associated with the connectivity of the client to the network.

Figure 5:
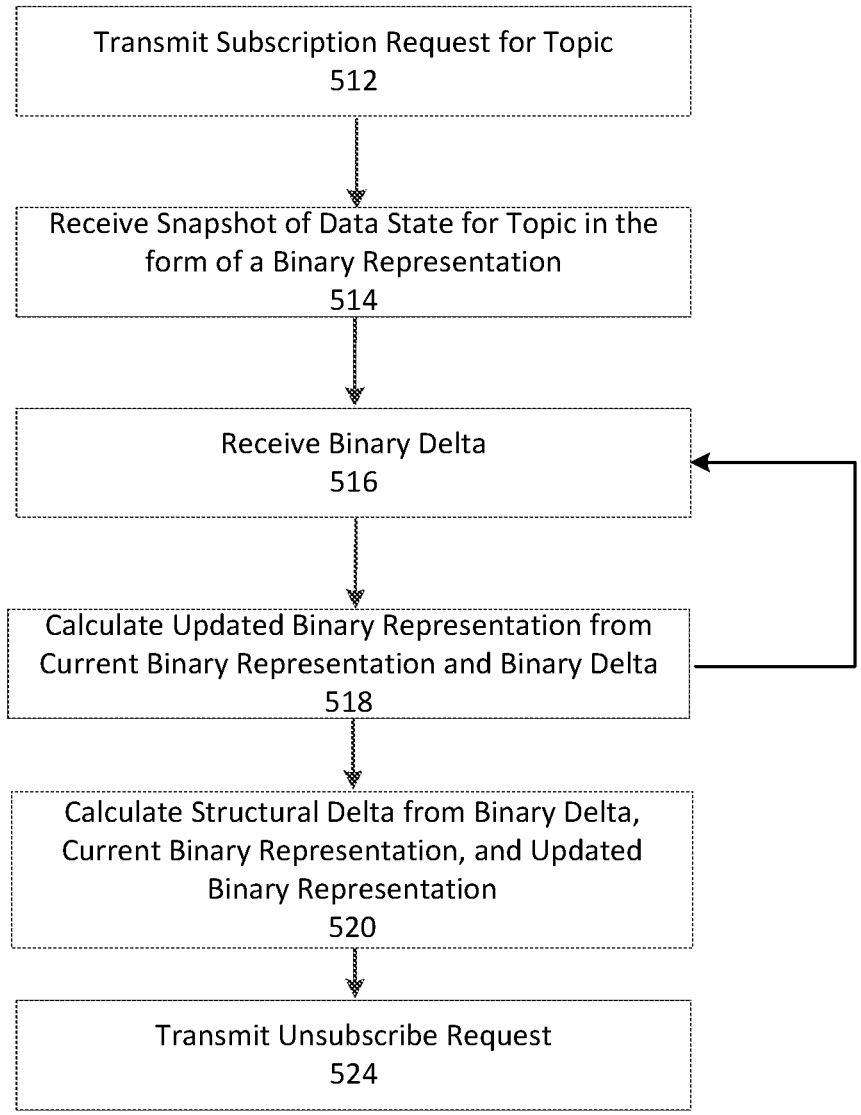
FIG. 5 is a flowchart illustrating a method for continuously receiving of binary deltas, converting binary deltas to new topic values, and calculating structural deltas on a client, according to one example embodiment.

It is useful to examine the method of FIG. 4 from the perspective of the client 106. FIG. 5 is a process flow for the client within the data distribution environment 100 of FIG. 1 participating in a delta stream. More specifically, the deltas of FIG. 5 are binary deltas, each binary delta associated with a change between two binary representations of JSON objects of a topic in a topic tree 116. In the embodiment of FIG. 5, the client 106 automatically receives binary deltas from the data distribution system server when subscribed to the topic.

The client transmits 512 a request to subscribe to a particular topic to the data distribution system 110. In some embodiments, subscribing to a topic can result in the client receiving 514 a snapshot of the current data state of the topic from the topic tree 116 via the network 180. The received current data state is typically a binary representation of a JSON object. In other embodiments the data state can be a JSON object, or a binary delta.

After the topic data state is updated to a new topic data state on the data distribution system server 110, the client 106 receives 516 the binary delta associated with the new topic data state from the data distribution system server 110. At any point after receiving the binary delta, the client can calculate 518 an updated binary value representation from the current binary value representation and the binary delta. This process is described in the section titled "Updating a Binary Value with Binary Deltas."

At any point after calculating 518 an updated binary value, the client 106 can calculate 520 the structural delta from the binary delta, the current binary value, and the updated binary value. Calculating structural deltas is discussed in more detail in the section titled "Calculating Structural Deltas."

Further, at any point the client can transmit 524 an unsubscribe request to the data distribution system server. The client is unsubscribed from the topic and will no longer receive binary deltas when the topic state of the unsubscribed topic changes on the data distribution system server 110.

III.C Calculating Binary Deltas

Moving forward, the description turns towards specific methods for calculating binary deltas. The data distribution system server employs an implementation of the Myers binary difference algorithm to calculate the differences between the binary value representations of the two topic values (i.e. binary representation of two JSON objects). The Myers difference algorithm is described in "An O(ND) Difference Algorithm and Its Variations," *Algorithmica*, 1:251-266, 1986. The result is a compact edit script describing the changes from an original binary value representation to a new binary value representation in terms of two operations: a 'match' edit operation which copies a byte sequence from the original binary value representation and an 'insert' edit operation that adds a new byte sequence. The match operation is generally included in the binary delta as bytes indicating the position and number of the matching bytes between the two binary values. The insert operation is generally included in the binary delta by including the inserted bytes in the binary delta.

Additionally, there can be a 'delete' edit operation that describes a byte sequence removed from the original binary value representation. The delete operation is generally included in the binary delta as bytes indicating the position and number of the deleted bytes from a binary value representation. The data distribution system server and data management module may re-calculate delete edits by considering the original value and the gaps between match and insert edits, such that redundant delete edits are not included in the transmitted binary delta. In one embodiment, the data distribution system server and data management module may omit delete edits from the binary delta. In this embodiment, the client 106 can infer that the delete edit exists based on the original binary value representation and the gaps between match and insert edits. This is described below.

The binary delta format used by the data distribution system server 110 can prevent consecutive edits of the same type, and can present edits in order with no overlaps or gaps in the byte strings to which they refer. The following is an example of the structure edit script for the transformation of the CBOR encoding binary values of the previous example's old and new JSON objects, i.e. {"maps": ["or", "lists"], and {"maps": ["and", "lists"]. To begin the binary byte strings for the old and new binary representations are:

Old Binary Representation: BF646D6170739F63616E64656C69737473FFFF

New Binary Representation: BF646D6170739F626F72656C69737473FFFF

From these two byte strings, an edit script between the old and new values is generated. The edit script represents how the old binary value representation should be edited to generate the new binary value representation. The edit script for this example is:

match [0,7] // "BF646D6170739F"
insert "626F72"
delete [7,5]
match [11,8] // "656C69737473FFFF"

Match [0,7] means that at byte position 0 of the old binary value representation, 7 bytes of the old binary value representation match with the new binary value representation. Insert "626F72" means that the byte string of 626F72 should next be inserted into the new binary representation. Delete [7,5] means that at byte position 7 of the old binary value representation, 5 bytes should be deleted and not transferred to the new binary value representation. Match [11, 8] means that at byte position 11 of the old value, 8 bytes match with the new binary value representation.

To generate the binary delta, the server 110 discards the redundant delete operation, and encodes the script using a pair of CBOR integers to represent match operations, and a CBOR byte string for insert operations. The resulting binary delta is eight bytes long: 000743626F720B08. A specific example of the generation of a binary delta is given below.

Henceforth, byte strings will use the following notation [B01, B02, B03, . . . ] where B01, B02, etc. are the bytes contained in a byte string, the bytes of the byte string are separated by ',' for readability, and the byte string is bounded by '[' and ']'. For example, the previous binary delta 000743626F720B08 is equivalent to [00, 07, 43, 62, 6F, 72, 0B, 08]. 00 and 07 represents the operation match [0, 7]. 43 is bytecode for an insert operation of 3 bytes, which is follows by insertion bytes of 62, 6F and 72. 0B, 08 represents operation match [11, 8]

The data distribution system server takes advantage of generating binary deltas within a topic state streaming foundation (i.e. the data distribution system). The data distribution system uses this data-oriented approach, the ability to share the cost of delta calculations across many subscribers (i.e. clients converting binary deltas to current values on the client), and the common occurrence of partially changing data streams amongst typical application use-cases to minimize system bandwidth and computational requirements of topic state streaming.

III.D Specific Calculation Example

The above description uses two topic data states represented by JSON objects, converts the objects into CBOR byte strings, and compares the byte strings to generate a binary delta for transmission within the data distribution system. The example within the sections titled 'Binary Delta Streams' and 'Calculating Binary Deltas' are described to provide an indication of a large amount of data that can be conserved by using this process, e.g. ~30 bytes to 8 bytes. However, the JSON objects used within the previous example are overly complex for an in depth description of the calculation of a binary delta. Below is a simpler example of calculating a binary delta between two JSON objects.

Figure 6:
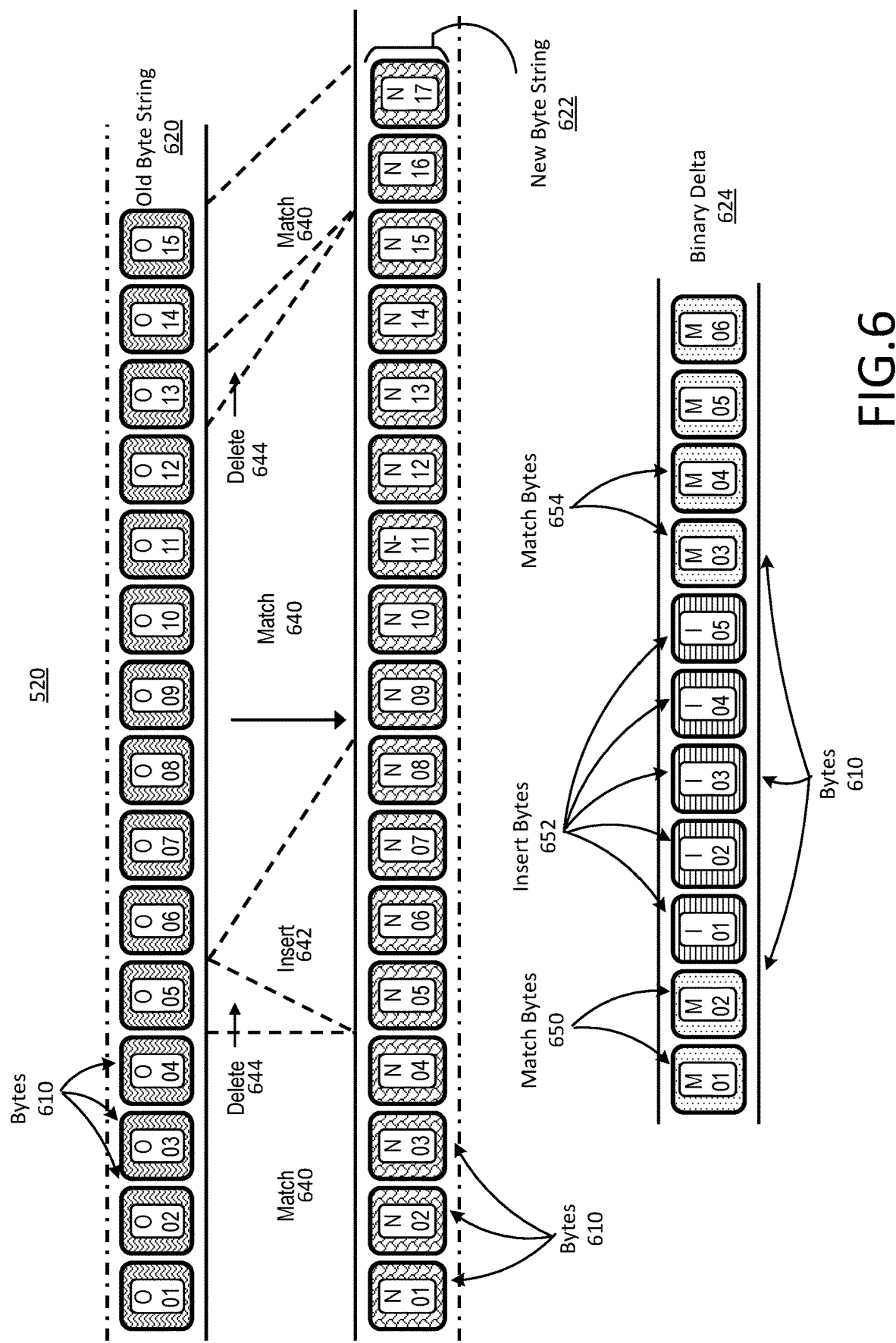
FIG. 6 is an illustration of the calculation of a binary delta from an old topic value and a new topic value, according to one example embodiment.

FIG. 6 shows a more thorough example of the calculation of a binary delta from binary representations of two JSON objects. Generalizing, the old JSON object is converted into bytes 610 and structured as a 15 byte string using the CBOR format, e.g. the old byte string 620 O01→O15. Similarly, a new JSON object is converted into bytes 610 and structured as a 17 byte string using the CBOR format, e.g. the new byte string 622 N01→N17. In a more specific example, the old JSON object and the new JSON object can be:

Old Value: {"a": [1, 2], "b": [1, 2, 3]}
New Value: {"a": ["xyz", 2], "b": [1, 2]}

Further, the byte string for the new value (i.e. new byte string 622) can be

| N01 | N02 | N03 | N04 | N05 | N06 | N07 | N08 | N09 | N10 | N11 | N12 | N13 | N14 | N15 | N16 | N17 |
|---|---|---|---|---|---|---|---|---|---|---|---|---|---|---|---|---|
| { | " | a" | [ | " | x | y | z", | 2 | ], | " | b": | [ | 1 | 2 | ] | } |
| BF | 61 | 61 | 9F | 63 | 78 | 79 | 7A | 02 | FF | 61 | 62 | 9F | 01 | 02 | FF | FF | where the first row are generalized CBOR bytes (N01, N02, etc.), the second row is the JSON element associated with each byte, and the third row is the CBOR bytes of the associated JSON element represented in hexadecimal.

Similarly, the byte string for the old value (i.e. old byte string 620) can be

| O01 | O02 | O03 | O04 | O05 | O06 | O07 | O08 | O09 | O10 | O11 | O12 | O13 | O14 | O15 |
|---|---|---|---|---|---|---|---|---|---|---|---|---|---|---|
| { | " | a" | [ | 1 | 2 | ], | " | b": | [ | 1 | 2 | 3 | ] | } |
| BF | 61 | 61 | 9F | 01 | 02 | FF | 61 | 62 | 9F | 01 | 02 | 03 | FF | FF | where the first row are generalized CBOR bytes (O01, O02, etc.), the second row is the JSON element associated with each byte, and the third row is the CBOR bytes of the associated JSON element represented in hexadecimal.

In this example, the four bytes of the old byte string 620 and new byte string 622 match 640 and a match edit is generated for the binary delta 624. Using the generalized nomenclature, bytes O01→O04 match bytes N01→N04 and the data management module produces the match edit 'match [M01, M02]'. In some embodiments, the match edit generates two match bytes 650 for the binary delta [M01, M02]. The first match byte, M01, indicates the position in the old byte string 620 in which the matching bytes of the new byte string begin (e.g. $1^{st}$ byte, $2^{nd}$ byte, etc.). The second match byte, i.e. M02, indicates the number of bytes from the new byte string that match the old byte string (e.g. 4 bytes, 5 bytes, or 10 bytes).

Using the CBOR bytes of the old and new byte strings as an example, the match edit can be match [00, 04] and the generated bytes for the binary delta can be [00, 04] where '00' indicates the byte position where the match begins and '04' indicates that four bytes from the new byte string match the old byte string.

To continue, the fifth through eighth bytes of the new byte string 622 are dissimilar from the fifth byte of the old byte string 620 and an insert edit is generated for the binary delta 624. Using the generalized nomenclature, byte O05 is dissimilar from byte N05 and the new byte 622 string does not again match the old byte string 620 until bytes O06 and N09, respectively. Thus, the data management module 118 produces the insert edit 'insert I02, I03, I04, I05'. Note the I02→I05 are equivalent to N05→N08 in this context. In some embodiments the insert edit generates a first insert byte, i.e. I01, to indicate that subsequent bytes, i.e. I02→I05, will be inserted from the new byte string 622 into the old byte string 620. Therefore, the insert edit generates five insert bytes 652 for the binary delta [I01, I02, I03, I04, I05]. The data manipulation module 118 can be configured such that the insert edit begins at the byte immediately following the most previous edit.

Using the CBOR bytes of the old and new byte strings as an example, the insert edit can be 'insert 6378797A' and the generated bytes for the binary delta can be [44, 63, 78, 79, 7A] where '44' indicates that four bytes will be inserted, and '63', '78', '79', and '7A' are the inserted bytes.

The fifth byte of the old byte string 620 is dissimilar from the fifth byte of the new byte string 622 and a delete edit is generated for the binary delta 624. That is, byte O05 of the old byte string 620 is dissimilar from byte N05 of the new byte string 622 and the data management module 118 produces the delete edit 'delete [D01, D02]'. In some embodiments, the delete edit generates two bytes for the binary delta [D01, D02]. The first delete byte, D01, indicates the position in the old byte string 620 of the first byte to delete. The second delete byte, D02, indicates the number of bytes from the old byte string to delete. Generally, delete edits and the corresponding bytes within the binary delta are redundant and are removed from the binary delta (or not generated) and not transmitted. Removing redundant delete operations further reduces the bandwidth necessary in a binary delta stream by reducing the total number of bytes in a binary delta. A concrete example of this will be provided below.

The sixth through twelfth bytes of the old byte string 620 match the ninth through fifteenth bytes of the new byte string 622 and a match edit is generated for the binary delta 624. Similarly to above, bytes O06→O12 match bytes N09→N15 and the data management module produces the match edit 'match [M03, M04]'. The match edit generates two match bytes 654 for the binary delta [M03, M04].

Using the CBOR bytes of the old and new byte strings as an example, the match edit can be match [05, 07] and the generated bytes for the binary delta can be [05, 07] where '05' indicates the beginning byte position where the match begins and '07' indicates that seven bytes from the new byte string 622 match the old byte string 620. In this example, as the match edit begins at the fifth byte, the previous delete edit that occurs at the fifth byte is redundant and removed from the binary delta 624.

The following table represents the calculated match, insert, and delete edit operations generating the binary delta of the above example:

| Binary Delta Edit | Old Value | New value |
|---|---|---|
| match [0,4] | {"a":[ | {"a":[ |
| insert 6378797A | — | "xyz" |
| delete [4,1] | 1 | — |
| match [5,7] | 2],"b":[1,2 | 2],"b":[1,2 |
| delete [12,1] | 3 | — |
| match [13,2] | ]} | ]} |

Using the above table, the data management module 118 calculates 422 the binary delta 624 of the above example as

| M01 | M02 | I01 | I02 | I03 | I04 | I05 | M04 | M05 | M06 | M07 |
|-----|-----|-----|-----|-----|-----|-----|-----|-----|-----|-----|
| 00  | 04  | 44  | 63  | 78  | 79  | 7A  | 05  | 07  | 0D  | 02  | where the top row is the generalized binary delta bytes and the bottom row are the specific values of the CBOR bytes in the binary delta 624 of the example. In this example, the data management module removes all delete edit operations from the binary delta 624. In some embodiments, any or all of the delete edits may be maintained by the data management module 118 and inserted into the binary delta 624.

The above example is used as a demonstration of the calculation of match, insert, and delete edit operations for a binary delta stream in calculating binary deltas between topic values. Any number and arrangement of match, insert, and delete operations can generate a binary delta to modify any number of bytes in any order between the two topic values.

III.E Updating a Binary Value with a Binary Delta

The previous example demonstrated how the data management module 118 of the data distribution system server calculated 422 binary deltas to transmit to clients. This section describes how the conversion module 132 of a client 106 can use the binary delta 624 to calculate updated binary value representation from current binary value representation and a binary delta 518. Similar to before, the bytes of the old binary value representation are formed into an old byte string using the conversion module 132 of the client, i.e. O01→O15. Using the above genericized binary delta, i.e. [M01, M02, I01, I02, I03, I04, I05, M04, M05, M06, M07], the current binary value representation is updated to the new binary value representation. The bytes of the new value can be represented as a new byte string, i.e. N01→N17.

The first two bytes of the binary delta 624, i.e. [M01, M02], indicate that the position (M01) and the number (M02) of bytes from the new byte string 622 that match the old byte string 620. The matching bytes remain unchanged. The next byte of the binary delta 624, i.e. [I01], indicates that the next four bytes of the binary delta, i.e. [I02, I03, I04, I05], will be inserted into the old byte string 620. The next two bytes of the binary delta 624, i.e. [M03, M04], indicate the position (M03) and the number (M04) of bytes from the new byte string that match the old byte string. The matching bytes remain unchanged but are moved within the old byte string 620. Finally, the subsequent two bytes of the binary delta 624, i.e. [M04, M05], indicate the position (M04) and the number (M05) of bytes from the new byte string 622 that match the old byte string. The matching bytes remain unchanged but are moved within the old byte string. Generally, each new edit from the binary delta will insert, shift, rearrange, or match bytes of the old byte string 622 such that each subsequent edit of the old byte string 622 is immediately following the last byte of the previous edit.

Using the specific example presented above, the byte string of the old value of the topic at the client 106 is

| O01 | O02 | O03 | O04 | O05 | O06 | O07 | O08 | O09 | O10 | O11 | O12 | O13 | O14 | O15 |
|-----|-----|-----|-----|-----|-----|-----|-----|-----|-----|-----|-----|-----|-----|-----|
| BF  | 61  | 61  | 9F  | 01  | 02  | FF  | 61  | 62  | 9F  | 01  | 02  | 03  | FF  | FF  | and the binary delta 624 received at the client 106 is

| M01 | M02 | I01 | I02 | I03 | I04 | I05 | M04 | M05 | M06 | M07 |
|-----|-----|-----|-----|-----|-----|-----|-----|-----|-----|-----|
| 00  | 04  | 44  | 63  | 78  | 79  | 7A  | 05  | 07  | 0D  | 02  |

The first two bytes of the binary delta, [00, 04], indicate that the position (00) and the number (04) of bytes from the old stream that are matching. These bytes are maintained for the new byte string, e.g. [BF, 61, 61, 9F]. The next bytes of the binary delta [44] indicates that the next four bytes of the binary delta [63, 78, 79, 7A] will be inserted into the old byte string. In this configuration, the conversion module 132 of the client 106 inserts the bytes immediately following the last match edit, e.g. [BF, 61, 61, 9F, 63, 78, 79, 7A]. The next two bytes of the binary delta, [05, 07], indicate the position (05) and the number (07) of bytes from the new byte string that match the old byte string. The matching bytes are shifted from their original position to the end of the inserted bytes, e.g. [BF, 61, 61, 9F, 63, 78, 79, 7A, 02, FF, 61, 62, 9F, 01, 02]. The next two bytes of the binary delta, [0D, 02], indicate the position (0D) and the number (02) of bytes from the new stream that match the old stream. The matching bytes are shifted from their original position to the end of the previous match bytes, e.g. [BF, 61, 61, 9F, 63, 78, 79, 7A, 02, FF, 61, 62, 9F, 01, 02, FF, FF].

III.F Visualizing Binary Deltas

A visualization of this process is also shown in FIG. 6. The match and insert edits are shown as relationships between the new byte string and the old byte string. The edit operations (Match 640; Insert 642; Delete 644) form a spine down the middle, aligned with the relevant byte sequences of the old byte string 620 and the new byte string 622 of the old and new binary value representation.

Observe that the old binary value representation correspond to a continuous sequence of match 640 and delete 644 edit operations, and that the new binary value representation corresponds to a continuous sequence of match 640 and insert 642 edit operations.

IV. Structural Deltas

The description now shifts towards the calculation of structural deltas 520. Structural deltas are determined at the client 106 by the conversion module 132. The conversion module 132 uses the binary delta, the received binary value representation, and the current binary value representation (i.e. the new and the old binary values representations of the previous example, respectively) to determine a structural delta. The binary value representations are generally represented as CBOR byte strings as previously described. The conversion module 132 employs an algorithm that uses the edit operation boundaries in the binary delta, in conjunction with two streams of token events from a structure-aware parser, to identify potential structure edits in a corresponding structural delta.

Beginning with the initial broad example, the distributed data server 110 supports the use of JavaScript Object Notation (JSON) data interchange format to represent rich composite data. For example the following two topic values (i.e. topic data states) may be represented as JSON objects:

Object 1: {"maps": ["and", "lists"]}
Object 2: {"maps": ["or", "lists"]}

The following represents a structural delta that describes the differences between the two JSON objects.

| REMOVE | { "/maps/0" : "and" } |
|---|---|
| INSERT | { "/maps/0" : "or" } |

Additionally, returning to the more detailed example provided in the specific calculation sections:

Old Object: {"a": [1, 2], "b": [1, 2, 3]}
New Object: {"a": ["xyz", 2], "b": [1, 2]}

The following represents a structural delta that describes the differences between data structures of the old and new JSON objects.

| REMOVE | /a/0=1  /b/2=3 |
|---|---|
| INSERT | /a/0="xyz" |

Each structural delta is composed of two structural edit operations describing changes to make to data structures of the old JSON object in order to generate the structures of the new JSON object. The REMOVE edit operation contains data items removed from the old JSON object. The INSERT edit operation contains data items added to the old JSON object to generate the new JSON object. Each edit operation includes a a JSON Pointer expression that identifies a location within a JSON data structure, and a value for that location. In these examples, the JSON pointer/a/0 and/maps/0 appear in both the REMOVE edit operation and the INSERT edit operation to represent that the value at that location has changed.

Structural deltas are particularly valuable where there are small changes to complex values. The client performs operations that return the parts of a structural delta that affect a given data item, allowing application components to filter changes of interest. Embodiments described herein can determine the structural delta from the binary delta in a computationally efficient manner that reduces the amount of time needed to generating the structural delta in a computer.

IV.A General Structural Delta Overview

A general description of the process for generating a structural delta algorithm is now provided. Two token parsers are used, one for stepping over the old binary representation of the old topic value and one for stepping over the new binary representation of the new topic value. A token parser is called incrementally to step forward over the bytes of each binary representation of the topic values, generating tokens as it identifies parts of the corresponding JSON object of the topic value, such as strings, numbers, or structure delimiters. The sequence of tokens collectively forms the value's token stream. These parsers are referred to below as the old token parser and the new token parser, respectively. Each token parser also maintains a stack reflecting the structural path of the current parse position.

Each binary delta edit operation in the binary delta is evaluated in turn, parsing the new and old byte strings of the binary representations. The token found at the end of each edit represents a point where there may be a structural difference between the two JSON objects for the old and new values.

Tokens in the old value covered by a match edit are skipped as they also appear in the new value. For each token in the old value covered by a delete, a REMOVE structural edit is added. For each token in the new value covered by an insert, an INSERT structural edit is added. Particular care is necessary where a token covers one or more binary delta edits. These cases of misaligned edges are called a split and are detailed in the section title "Splits." More simply, a split is a point in a value's binary representation where the end of a binary delta edit does not correspond to the end of a token in the value's token stream.

The process of matching binary deltas against the parsed tokens produces a correct but sub-optimal structural delta. False positives are commonly reported, where the same sub-value is added to both the REMOVE and INSERT sets. This can occur if the binary delta associates binary data in some data item with structure delimiters, or because an array contains multiple instances of the same data item and the "wrong" one was matched with a change in the new value. A different problem occurs where all of the elements in a structure are reported as a sequence of REMOVE or INSERT edits—in this instance it can be better to report a single edit against the structure itself. Various heuristics are applied to address these problems and improve the quality of the result and are described below.

IV.B Tokens

Generally, tokens are single structural elements of a value. For example, a token can be a single item from a JSON object such as a number, string, structure delimiter, or the start and end of an array. As examples, CBOR byte strings can result in the following types of tokens when parsed by a token parser:

| Token Type | Example JSON Syntax |
|---|---|
| STRING | "xyz" |
| NUMBER | 1.234 |
| TRUE | true |
| FALSE | false |
| NULL | null |
| START_OBJECT | { |
| END_OBJECT | } |
| START_ARRAY | [ |
| END_ARRAY | ] |
| FIELD_NAME | { "field_name": value} |

The token stream for the old JSON object from the previously described example, i.e. {"a": [1, 2], "b": [1, 2, 3]}, having the CBOR byte string [BF, 61, 61, 9F, 01, 02, FF, 61, 62, 9F, 01, 02, 03, FF, FF] is START_OBJECT, FIELD_NAME, START_ARRAY, NUMBER, NUMBER, END_ARRAY, FIELD_NAME, START_ARRAY, NUMBER, NUMBER, NUMBER, END_ARRAY, END_OBJECT. In this example, there is a token for every byte except the values of the FIELD_NAME tokens (i.e. "a" and "b").

IV.C Span Parsers

Each token parser is wrapped by a higher level component known as a span parser. The span parser uses a method that reads tokens up to a target byte offset, reporting the result as a sequence of JSON pointer expressions. The sequence of tokens read by a single operation is known as a span. The span parser collapses each complete structure found in a span to a single JSON Pointer reference to the structure. A span finishes at the end of the first token found after the target offset, with two exceptions. First, if a split is found in a field name, the span continues until the next sub-value (potentially parsing one additional token of the token stream). This is because the same JSON pointer is used to represent a change to a field name or a change to a field's value (except if the value is a structure and the change only affects part of the structure). Second, END_STRUCTURE tokens are always read which can have two benefits: first, reading END_STRUCTURE tokens collapses empty structures to the appropriate parent pointer; and second, the closing tokens of non-empty structures are associated with the last pointer which simplifies edit operation boundary detection. The implementation relies on the span parser not reading START_STRUCTUER tokens at a split unless instructed to do so by the conversion module. This provides greater alignment between the detected binary differences and the token parsers, allowing a simpler pairing of tokens between the two streams.

The two token streams are treated symmetrically. Each span parser is moved in a forward direction; there is no backtracking. Within this method, based on any of: the misalignment of old and new span parser and, the current edit type, the JSON pointers associated with the parsed bytes, and the tokens parsed, the conversion module 132 can generate potential structural edits for the structural delta.

IV.D Heuristic Clean Up

The basic approach of using the binary delta to identify splits and matching the splits to the appropriate tokens produces a reasonable but imperfect result. Further processing is performed to improve the output. False positives (redundant REMOVE, INSERT pairs) can occur in the raw results. These false positives are identified and removed by comparing each potential REMOVE edit with the previous INSERT edit, and each potential INSERT edit with the previous REMOVE edit. If the associated values are equal, and the pointers are compatible, both edits are removed. IN another example, the raw results can contain pointers to the entire contents of a structure and are replaced with a single pointer to the structure.

IV.E Calculating Structural Deltas

Figure 7:
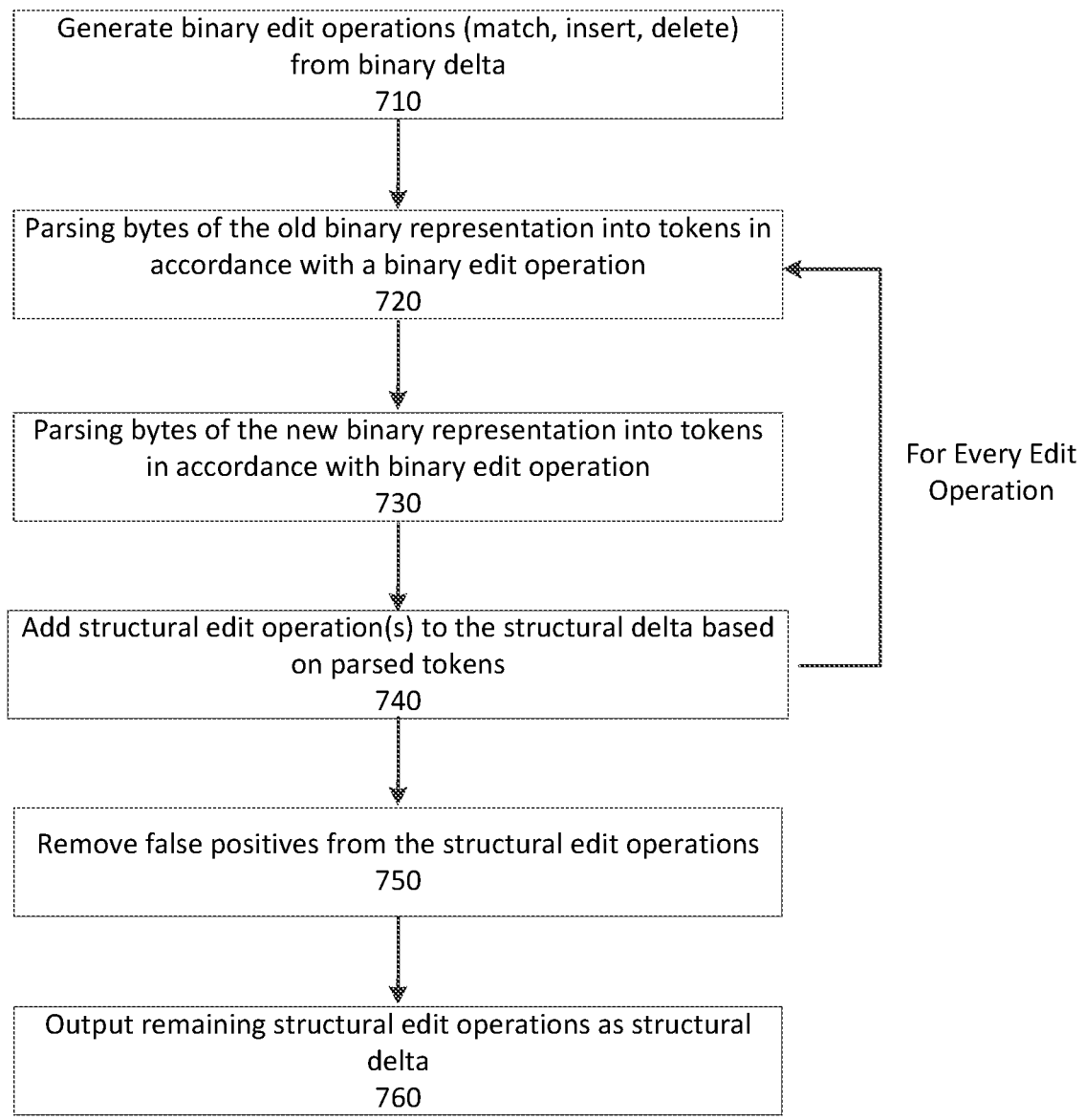
FIG. 7 is a flowchart further illustrating a method for calculating structural deltas on a client, according to one example embodiment.

To continue FIG. 7 is a process flow for calculating a structural delta from a received binary delta, a current binary value, and an updated binary value. In one embodiment, the process flow of FIG. 7 represents step 520 of the process flow of FIG. 5.

To begin, the conversion module 132 generates 710 binary edit operations (i.e. match, insert, delete) from the received 516 binary delta. The binary edit operations are generated based on the edit boundaries within the binary delta byte string.

For every binary edit operation, the conversion module 132 parses 720 bytes of the old binary representation into tokens in accordance with the binary edit operation. That is, for each edit operation of the binary delta, the conversion module 132 parses bytes of the old byte string and generates tokens for the old token stream. Similarly, the conversion module 132 parses 730 bytes of the new binary representation into tokens in accordance with the binary edit operation. That is, for each edit operation of the binary delta, the conversion module 132 parses bytes of the new byte string and generates tokens for the new token stream.

For each binary edit operation, the conversion module 132 adds 740 structural edit operation(s) to the structural delta based on the tokens of the old token stream and new token stream parsed by the old span parser and new span parser, respectively. That is, for the parsed tokens of each token stream, the span parsers compare the parsed tokens and determines a structural edit operation based on the type of parsed tokens and the relative location of each span parser in their respective token stream. Based on any of: the misalignment of old and new span parser and, the current edit type, the JSON pointers associated with the parsed bytes, and the tokens parsed, the conversion module 132 can generate potential structural edits for the structural delta. This is explained in the section titled "Specific Structural Delta Calculations."

After the new and old token streams have been parsed, the structural delta is analyzed and the conversion module 132 removes 750 false positives from the structural edit operations. After the false positives have been removed, the remaining structural edits are output 760 as a structural delta. The structural delta represents structural changes in the data structures from the old JSON value to the new JSON value. In some instances the structural delta can be used by an application to determine a new value of the topic. The new value of the topic can be displayed on the user interface of the client device. In some embodiments, only elements of the value that are changed by the structural delta are updated on the display (e.g. a stock ticker, or a sports score).

The structural delta can provide an application on the client device with a decoded representation of the change between the two binary values representing the same topic. Importantly, the structural delta algorithm requires only a single parse of both values. The computational time of the algorithm scales with the size of the value and the binary delta. The computational space required also scales as a function of structure depth of each value but is independent of the value size. Simply stated, larger values and larger binary deltas are more expensive computationally, but small values and small deltas are relatively inexpensive computationally. Generally, the binary delta streaming uses smaller values and deltas that are more computationally efficient than alternative algorithms for determining structural deltas.

IV.F Visualization of Structural Deltas

Figure 8A:
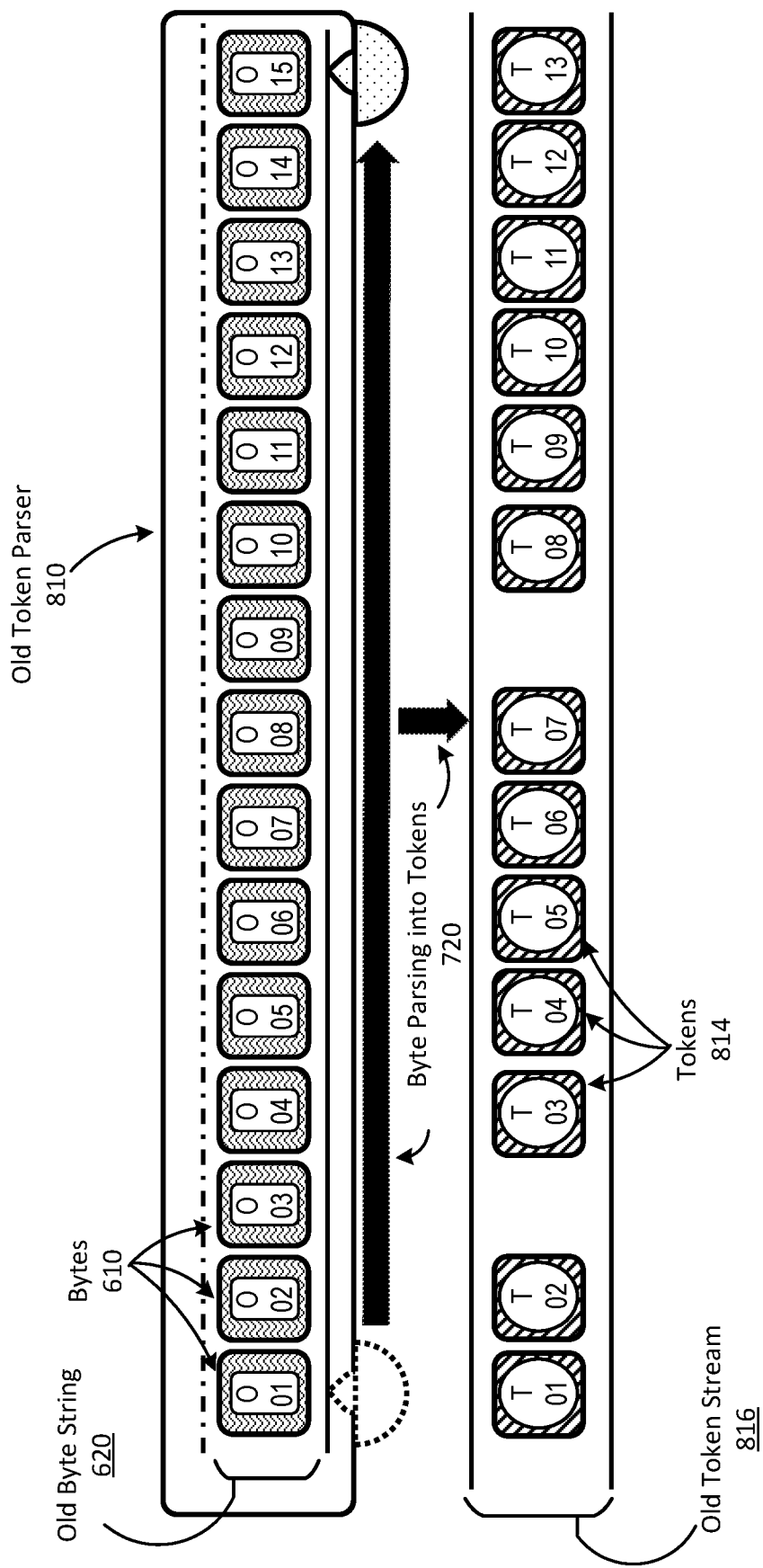
FIG. 8A is an illustration of a token parser, according to one example embodiment.

For ease of understanding visualization of elements of structural delta calculations are provided. FIG. 8A illustrates a representation of the old token parser 810 parsing 720 the bytes 610 of the old token string 816. The old token parser generates tokens 814 for the old token stream 816. Each token 814 of the old token stream 816 can be associated with the location of a byte 610 in the old byte string 620.

Figure 8B:
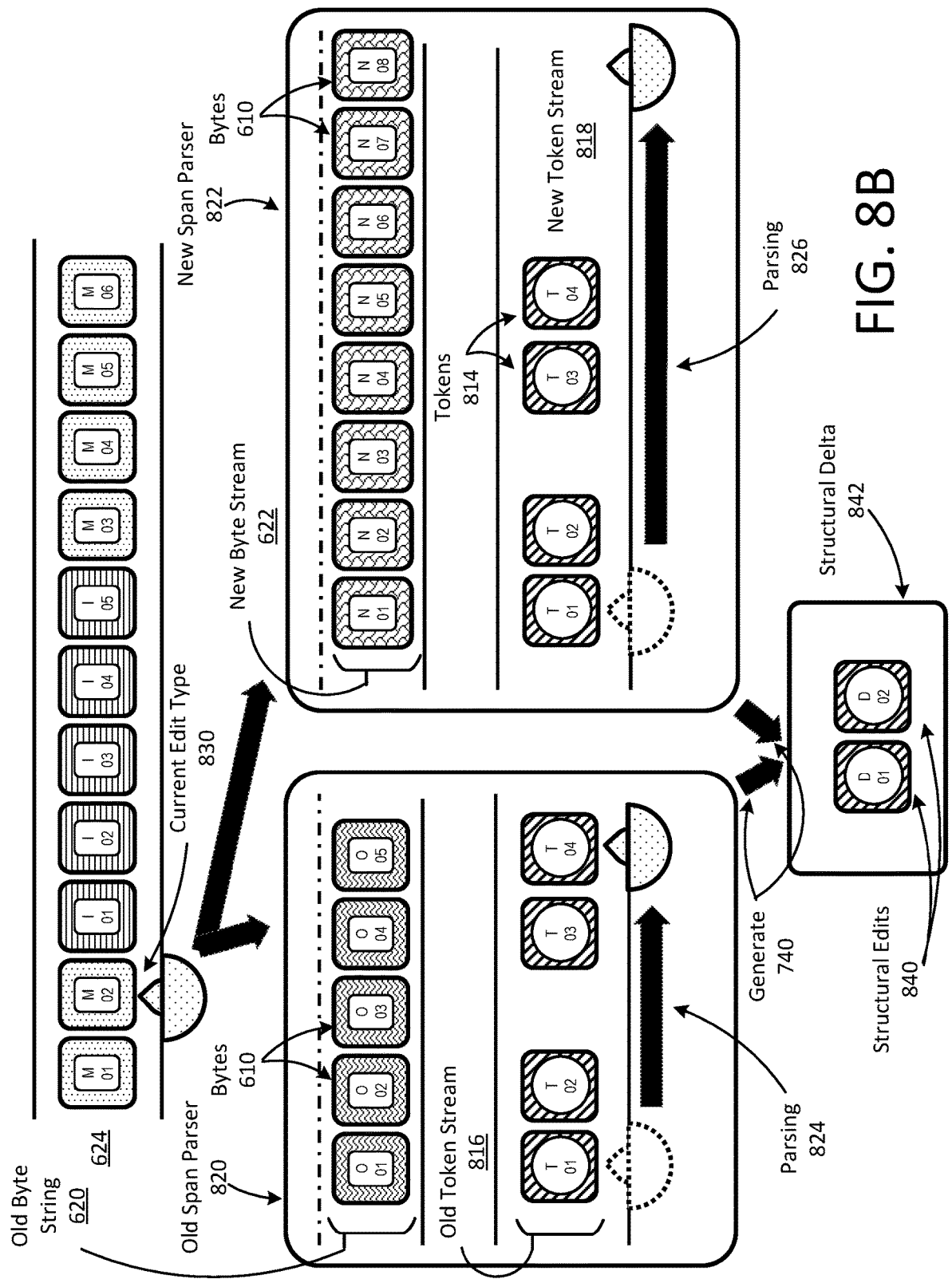
FIG. 8B is an illustration of a span parser, according to one example embodiment.

FIG. 8B illustrates a representation of the old span parser 820 and parsing 824 the tokens 814 of the old token stream 816 and the new span parser 822 and parsing 826 the tokens 814 of the new token stream 818. The number of tokens 814 parsed depends on the current edit operation 830 of the binary delta 624. In this example, four tokens from the old token stream 816 are parsed reading 5 bytes of the old byte string 620 and four tokens from the new token stream 818 are parsed reading 8 bytes of the new byte stream 622. Based on the token type, JSON pointers, parser location, and edit type, the span parser can generate 740 potential structural edits 840 for the structural delta 842. In this example, the misalignment of old and new span parser 820 and 822, the current edit type 830, and the JSON pointers associated with the parsed bytes, and the tokens parsed generates two potential structural edits for the structural delta.

IV.G Specific Structural Delta Calculation Example

To continue, calculation of a structural delta from a binary delta, a current binary representation and an updated binary representation is explained using the previously described old binary representation, new binary representation, and associated binary delta. For reference the new binary representation is:

| N01 | N02 | N03 | N04 | N05 | N06 | N07 | N08 | N09 | N10 | N11 | N12 | N13 | N14 | N15 | N16 | N17 |
|---|---|---|---|---|---|---|---|---|---|---|---|---|---|---|---|---|
| { | " | a" | [ | " | x | y | z", | 2 | ], | " | b": | [ | 1 | 2 | ] | } |
| BF | 61 | 61 | 9F | 63 | 78 | 79 | 7A | 02 | FF | 61 | 62 | 9F | 01 | 02 | FF | FF |

The first row is generalized CBOR bytes (N01, N02, etc.), the second row is the JSON elements associated with each byte, and the third row is the CBOR bytes of the associated JSON elements represented in hexadecimal. Parsing 720 bytes of the new byte string to generate the new byte stream for the new value is similar to the description for the old token stream above.

Similarly, the old binary representation is:

| O01 | O02 | O03 | O04 | O05 | O06 | O07 | O08 | O09 | O10 | O11 | O12 | O13 | O14 | O15 |
|---|---|---|---|---|---|---|---|---|---|---|---|---|---|---|
| { | " | a" | [ | 1 | 2 | ], | " | b": | [ | 1 | 2 | 3 | ] | } |
| BF | 61 | 61 | 9F | 01 | 02 | FF | 61 | 62 | 9F | 01 | 02 | 03 | FF | FF |

The first row is generalized CBOR bytes (O01, O02, etc.), the second row is the JSON elements associated with each byte, and the third row is the CBOR bytes of the associated JSON elements represented in hexadecimal. Parsing 720 bytes of the old byte string to generate the new old stream for the old value is described above.

The binary delta between the two values is:

| M01 | M02 | I01 | I02 | I03 | I04 | I05 | M04 | M05 | M06 | M07 |
|---|---|---|---|---|---|---|---|---|---|---|
| 00 | 04 | 44 | 63 | 78 | 79 | 7A | 05 | 07 | 0D | 02 |

The first row is generalized CBOR bytes (M01, I01, etc.), the bottom row are the specific values of the CBOR bytes in the binary delta of the described example.

The conversion module 132 generates 710 a first binary edit operation from the received binary delta. For example, the first binary edit operation can be the first two bytes of the binary delta byte string, i.e. [M01, M02]. The binary edit operation can be interpreted by the conversion module 132 as a match edit 'match [M01, M02]'. Based on the generated 710 binary edit operation the new/old token parsers parse 720 and 730 the new/old byte string and create a new/old token stream. Once the match edit has been processed, based on the edit operation type, the parsed tokens of the token streams, the parsed bytes of the byte strings, and the position of the span parsers within the token streams, the conversion module 132 adds 750 potential structural edit operations to the structural delta.

Using the specific example from above, the first generated 710 binary edit operation is the first two bytes of the binary delta byte string, i.e. [00, 04]. The binary edit operation can be interpreted by the conversion module 132 as a match edit 'match [0,4]'. Based on the generated binary edit operation, the new/old token parsers parse 720 and 730 the new/old byte string and create a new/old token stream.

In this example old span parser advances up to and including the fourth byte of the old binary representation. The old span parser reads the following four whole tokens:

| Token | Sub-Value |
|---|---|
| START_OBJECT | { |
| FIELD_NAME | "a" |
| START_ARRAY | [ |
| NUMBER | 1 |

Following the methodologies described above, the old span parser continues beyond the fourth byte and reads the first element of the array (i.e. the number 2) processing 5 bytes of the old byte string, i.e. [BF, 61, 61, 9F, 01].

Similarly the new span parser identifies advances up to and including the fourth byte of the new binary representation. The new span parser reads the following four whole tokens:

| Token | Sub-Value |
|---|---|
| START_OBJECT | { |
| FIELD_NAME | "a" |
| START_ARRAY | [ |
| STRING | "xyz" |

Following the methodologies described above, the old span parser continues beyond the fourth byte and reads the first element of the array (i.e. the string) processing 8 bytes of the new byte string, i.e. [BF, 61, 61, 9F, 63, 78, 79, 7A].

The end of the match edit operation generated 710 from the binary delta is found and a potential REMOVE and INSERT structural edit are added to the binary delta 740. In this example the REMOVE edit is at/a/0 with the value of 1 and a potential INSERT edit is at /a/0 with the value of "xyz".

Continuing for the next edit operation, the conversion module 132 infers and generates 710 a delete edit operation from the binary delta based on adjacent edit operations and the tokens parsed by the old span parser. For example, the second binary operation can be interpreted by the conversion module 132 as a delete edit 'delete[D01, D02]'. Delete edit operations only apply to the old token stream so the original span parser is advanced. Tokens can be generated from the parsed 720 and 730 byte streams. In this specific example, the old span parser is already at the end of the delete edit operation and is not advanced. In some cases, the old span parser may advance tokens and/or read additional bytes from the old token stream. Once the delete edit has been processed, based on the parsed tokens of the token streams, the delete edit operation, the location of the span parsers, and the parsed bytes of the byte strings the conversion module 132 adds potential structural edits to the binary delta.

Moving forward, the conversion module 132 generates a third binary edit operation from the received binary delta. For example, the third binary edit operation can be the subsequent five bytes of the binary delta byte string, i.e. [I01, I02, I03, I04, I05]. The binary edit operation can be interpreted by the conversion module 132 as an insert edit 'insert I01, I02, I03, I04, I05'.

Insert edits only apply to the new token stream, so only the new span parser is advanced. Tokens can be generated from the parsed 720 and 730 byte streams. In this specific example, the previous match edit advanced the new span parser to the end of the insert edit and the new span parser is not advanced further. In some cases, the new span parser can advance tokens and read additional bytes from the new token stream. Once the insert edit has been processed, based on the parsed tokens of the token streams, the insert edit operation, the location of the span parsers, and the parsed bytes of the byte strings, the conversion module 132 records potential structural edits.

While not explicitly described for this example, the structural edits of the structural delta can have any false positives removed as described.

Continuing using the described methodology through the binary delta by generating edit operations 710, parsing byte strings 720, and parsing tokens 730 and 740, adding structural edit operations to the delta, and removing false positives from the delta, the outputted 760 structural delta for this specific example is:

| | |
|---|---|
| REMOVE | /a/0=1 /b/2=3 |
| INSERT | /a/0="xyz" |

IV.H Splits

While not shown in any of the above examples, splits can occur while parsing the token streams. The appropriate processing of a split depends on the type of edit in which the split is found. Again a split is a case in which a token covers one or more binary edit operations. More simply, a split occurs when the last parsed byte of each span parser are not aligned at an edge (i.e. at the last parsed token). For all edit types, the conversion module 132 detects and processes trailing-edge splits; i.e. splits detected at the end of a span because the end of the last parsed token is after the end edge. The conversion module 132 also considers leading-edge splits for match edits.

Handling Split Insert Edits

In one implementation, the insert edit operation inserts all bytes identified by the insert edit operation. If a trailing-edge split is detected, the conversion module 132 performs one of two things. First, if the old token parser is at a split token, no further action is taken by the conversion module 132. The split will have been considered and processed for an earlier edit. Second, if the old token parser is not at a split token, the conversion module 132 reads the whole token of the old token stream and adds a REMOVE structural edit for the next pointer in the old stream. The old token stream is otherwise unaffected by the insert event. Reading the whole token may advance the old token parser further into other delete or match edits. In all cases, for correct handling of the insert split, the conversion module 132 adds a REMOVE structural edit for the first JSON pointer found.

Further split detection is used to detect differences that affect the value structure. If the parser structure depth is different at the end of the span than it was at start, the last token is treated in the same manner as a trailing-edge split. Without this, comparing ["b"] with [["a", "b", "c"]] incorrectly generates INSERT/0, INSERT/2 rather than INSERT/0, REMOVE/1, INSERT/1, INSERT/2. (Which heuristic-clean up will simplify to a single REMOVE, INSERT pair).

Handling Split Delete Edits

The processing of splits for delete events is the inverse of that for insert events. I.e. swap INSERT structural edits for REMOVE structural edits and the new token stream and parser with the old token stream and parser.

Handling Split Match Edits

In one implementation, processing match edit splits moves both span parsers. Either or both of the new token stream and old token stream can have a trailing-edge split (i.e. a split before splits detected at the beginning of a span because the beginning of the last parsed token is before the front edge). If neither are split, or if only one is split, the data distribution system server takes no further action. As proofs by example, two cases are presented: first, if there is a match edit associating a common subsequence of two different token streams, there will also be insert or delete edits with trailing edge splits; and second, if the match edit ends with a start structure token ({ or [ in JSON), the differences in the structure content will be detected by later edits.

Consideration of the parse depth is unnecessary for match trailing-edge splits. A difference in structure depth must correspond to a binary difference covering structure delimiters, which will be handled by insert or delete processing.

There is another implementation for dealing with for match edits. A token in one token stream can match the end and start of two tokens in the other stream. The conversion module 132 checks each token stream for a leading-edge split. If the new stream parser is at the expected offset from the detected split, and the old stream parser is not, the conversion module has found a token spanning across two matches edits in the old token stream. In this case, previous edit will have inserted the first pointer for the new stream. The conversion module 132 adds the next found pointer in the new token stream in the match edit span (if any). Similar processing is performed if the old stream parser is at the expected offset, but the new stream parser is not.

The algorithm described herein employed by the data management module is scalable, requiring a single parse across both values. The parsers hold the minimal state to track the current position within the value structure. The algorithm is stream-friendly in that neither the values nor the binary delta need to be fully realized in memory.

The given examples are meant to demonstrate functionality of the structural delta algorithm. This algorithm can generate any structural delta from any two binary representations of JSON objects and the binary delta between them. The structural delta can have any number and form of structural edits.

IV.I Visualization of Splits in Structural Deltas

A visualization of several possible split cases when determining a structural delta between two binary representations of JSON objects is described.

Figure 8C:
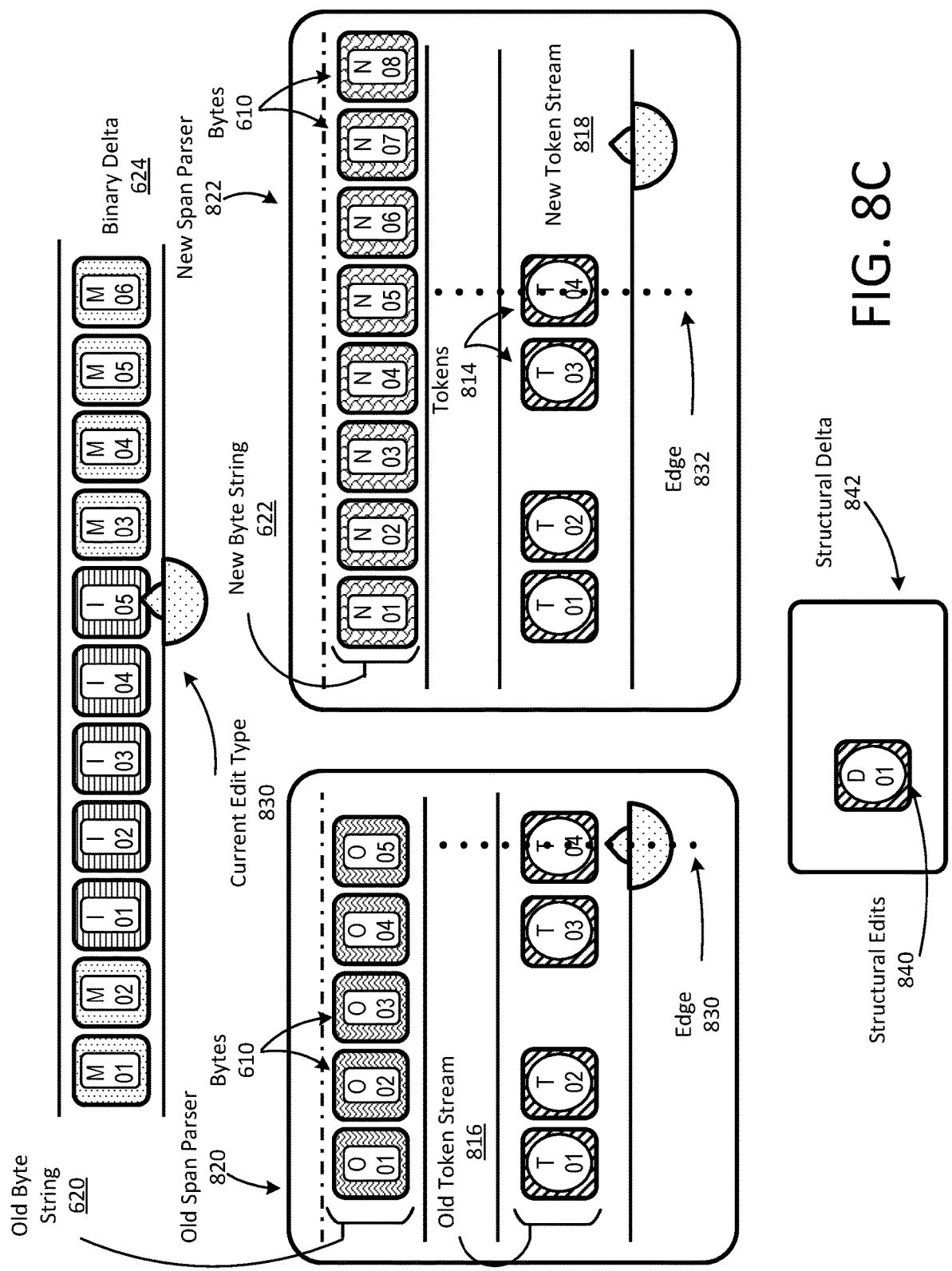
FIG. 8C-8E are illustrations of split cases when generating structural deltas, according to one embodiment.

FIG. 8C illustrates a first example of a split. In this example, the current edit type 830 of the binary delta 624 is an insert. The insert edit has advanced the old span parser to the fifth byte 610 of the old byte string 620 and parsed the fourth token of the old token stream. Parsing the fourth token 814 does not necessitate advancing the old span parser 820 further into the old byte string 620. As the last token parsed is the fourth token, the edge 830 of the old span parser 820 is aligned between the old token stream 816 and the old byte string 620. Additionally, the insert edit has advanced the new span parser 822 forward and parsed the fourth token of the old token stream 818. Parsing the fourth token 814 advances the new span parser 822 further into the new byte string 620. As the last token parsed is the fourth token the edge 832 of the new span parser 822 is aligned with the fifth byte of the new byte string N05. As the new span parser 822 advanced in the new byte string 822 to the seventh byte N07, the new span parser is misaligned with the edge and there is a split. This type of split can generate a structural edit 840, e.g. REMOVE or INSERT, for the structural delta 842.

Figure 8D:
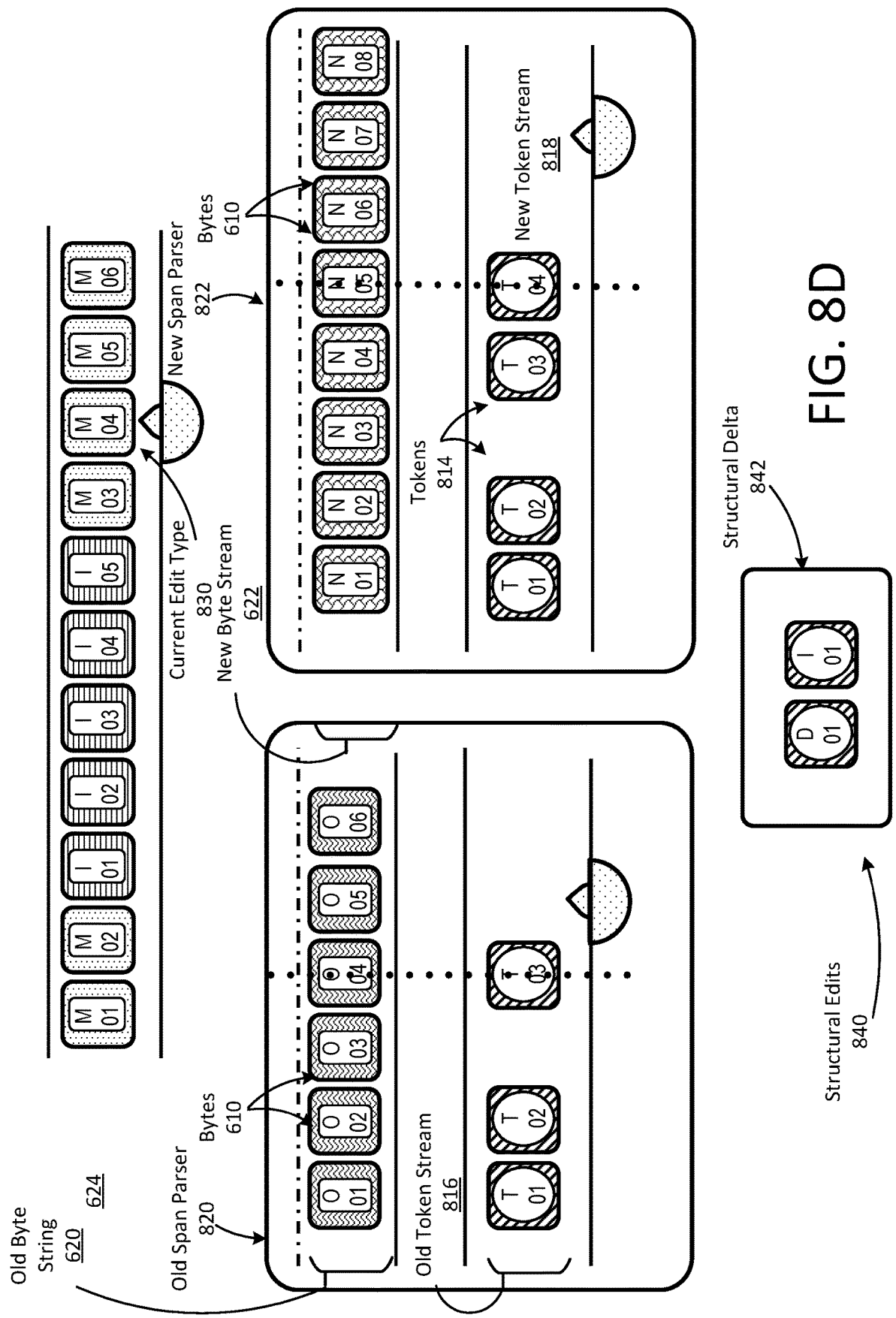

FIG. 8D illustrates a second example of a split. In this example, the current edit type 830 of the binary delta 624 is a match. The match edit has advanced the old span parser to the fourth byte 610 of the old byte string 620 and parsed the third token of the old token stream. Parsing the third token 814 advances the new span parser 822 further into the new byte string 620 to 005. As the last token parsed is the third token, the edge 830 of the old span parser 820 is aligned with the fourth byte of the new byte string 620 O04. Additionally, the match edit has advanced the new span parser 822 to the fourth byte 610 of the old byte string 620 and parsed the third token of the old token stream. Parsing the third token 814 advances the new span parser 822 further into the new byte string 620 to N07. As the last token parsed is the fourth token, the edge 832 of the new span parser 822 is aligned with the fifth byte of the new byte string 622 N05. The span parsers are misaligned with their respective edges and there is a split. This type of split can generate a structural edit 840 for the structural delta 842.

Figure 8E:
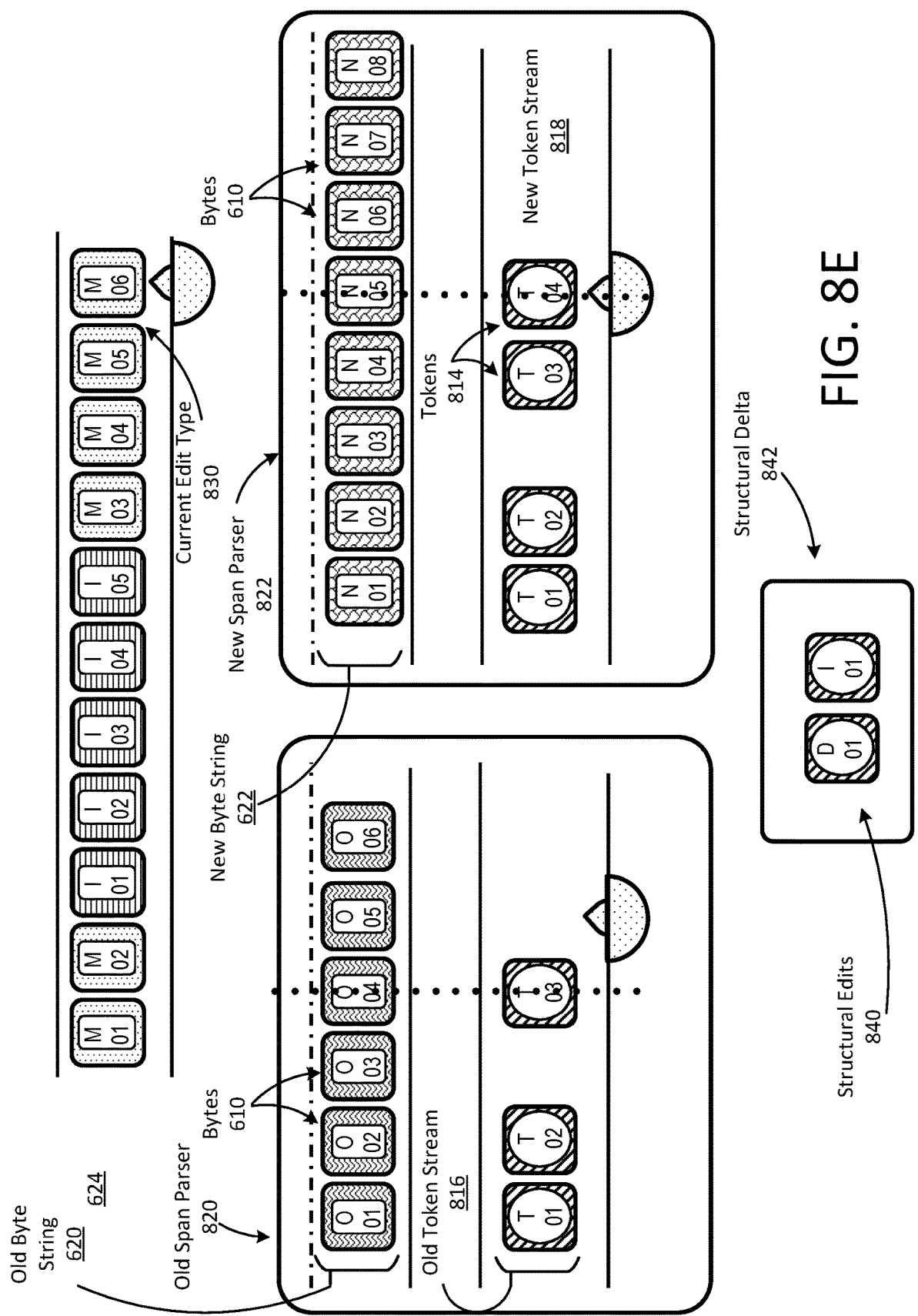

FIG. 8E illustrates a third example of a split. In this example, the current edit type of the binary delta 624 is a match. The position of the new span parser 822 is aligned with the edge 832, i.e. the last parsed token 814 does not advance the new span parser 822 into the new byte string 622. The position of the old span parser 820 is misaligned with the edge 830, i.e. the last parsed token advanced the old span parser further into the old byte string 620. This type of split can generate a structural edit 840 for the structural delta 842.

These examples of FIGS. 8C-8E are illustrations of three specific split cases. One skilled in the art will note that a split can occur at any time that when at least one span parser is misaligned with an edge. There can be any number of cases of generating a structural delta that can induce a split. Each split can generate a case specific structural edit 840 for the structural delta 842.

V. Other Considerations

Figure 9:
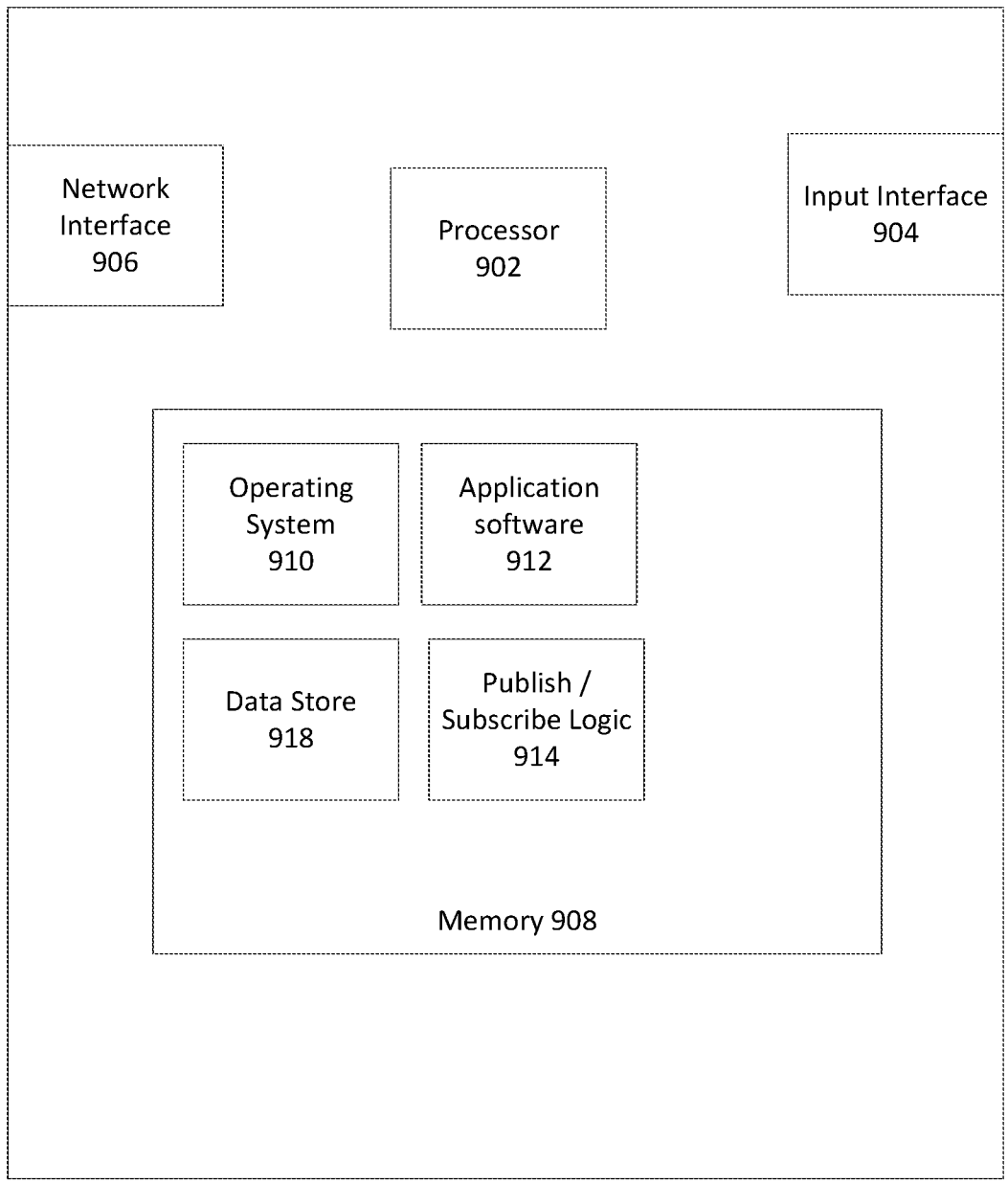
FIG. 9 is a schematic diagram of a computing device for implementing a server or client device, according to one embodiment.

FIG. 9 is a schematic diagram of a computing device for implementing a server 110 or client device, according to one embodiment. The computing-based device may be implemented as any form of a computing and/or electronic device in which embodiments of the pub/sub system may be implemented.

The computing-based device comprises one or more processors 902 which may be microprocessors, controllers or any other suitable type of processors for processing computer executable instructions to control the operation of the device in order to manage and control publish and subscribe operations in a pub/sub system. In some examples, for example where a system on a chip architecture is used, the processors 902 may include one or more fixed function blocks (also referred to as accelerators) which implement a part of the queue serving and transmission methods in hardware (rather than software or firmware).

The computing-based device also comprises an input interface 904, arranged to receive messages relating to a topic from the publishers 114 when the publishers 114 are in an external system 102, and at least one network interface 906 arranged to send and receive data messages over the communication network 180. In some examples, the input interface 904 and network interface 906 can be integrated.

Computer executable instructions may be provided using any non-transitory computer-readable media that is accessible by the computing based device. Non-transitory computer-readable media may include, for example, computer storage media such as memory 908 and communications media. Computer storage media, such as memory 908, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. Although the computer storage media (memory 908) is shown within the computing-based device it will be appreciated that the storage may be distributed or located remotely and accessed via a network or other communication link (e.g. using network interface 906).

Platform software comprising an operating system 910 or any other suitable platform software may be provided at the computing-based device to enable application software 912 to be executed on the device. Additional software provided at the device may include publish/subscribe logic 914 for implementing the various functions described herein. The memory 908 can also provide a data store 918, which can be used to provide storage for data used by the processors 902 when performing the queue serving and transmission operations. This can include storing of the messages from the publishers and storing of the virtual queues.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Various other modifications, changes and variations which will be apparent to those skilled in the art may be made in the arrangement, operation and details of the method and apparatus of the present embodiments disclosed herein without departing from the spirit and scope of the disclosure as defined in the appended claims. Therefore, the scope of the disclosure should be determined by the appended claims and their legal equivalents.

What is claimed is:

1. A method for publishing topic updates to a client device, the method comprising:
maintaining, at a data distribution system server, a data structure describing a plurality of topics to which a client can subscribe and a publisher can publish;
transmitting, to the client from the data distribution system server, a first binary representation of a data object describing a topic value of a topic of the plurality of topics to which the client is subscribed; and
responsive to receiving a changed topic value of the topic within the data structure from the publisher at the data distribution server, publishing a binary delta to the client that represents a difference between the first binary representation and a second binary representation of a second data object describing the changed topic value of the topic,
wherein the client is adapted to:
receive the published binary delta,
calculate the second binary representation from the binary delta and the first binary representation,
generate a structural delta from the first binary representation, the second binary representation, and the binary delta, the structural delta representing a structural difference between data structures of the first text-based object and data structures of the second text-based object, and
determine the changed topic value of the topic from the structural delta.

2. The method of claim 1, further comprising:
receiving, at the data distribution system server from the client, a subscription to the topic of the plurality of topics; and
updating the data structure describing the plurality of topics responsive to the received subscription.

3. The method of claim 2, wherein transmitting the first binary representation of the first data object describing the topic value to the client is in response to receiving the subscription to the topic from the client.

4. The method of claim 1, further comprising:
responsive to receiving the changed topic value of the topic from the publisher at the data distribution server, calculating the binary delta between the changed topic value of the topic and the topic value of the topic.

5. The method of claim 1, wherein the data structure maintained by the data distribution server comprises a topic tree maintaining topic values for each of the plurality of topics as binary representations, and the method further comprises:
updating the topic value of the topic in the topic tree to the changed topic value using the binary delta.

6. The method of claim 1, wherein maintaining the data structure describing a plurality of topics to which the client can subscribe and the publisher can publish further comprises:
storing information detailing a most recent binary delta transmitted to the client; and
storing a most recent binary representation of the topic value of the topic transmitted to the client.

7. The method of claim 6, wherein a subsequent binary delta published to the client is based on the most recent binary delta and the most recent binary representation of the topic value of the topic transmitted to the client.

8. The method of claim 1, further comprising:
receiving, at the data distribution system server from the client, an unsubscription request to the topic of the plurality of topics; and
wherein responsive to receiving an additional changed topic value of the topic from the publisher at the data distribution server, the data distribution system does not publish a new binary delta to the client that represents a difference between the additional changed topic value of the topic and the changed topic value of the topic.

9. A non-transitory computer-readable storage medium storing computer program instructions for publishing topic updates to a client device, the computer program instructions executable by a computer processor to perform operations comprising:
maintaining, at a data distribution system server, a data structure describing a plurality of topics to which a client can subscribe and a publisher can publish;
transmitting, to the client from the data distribution system server, a first binary representation of a data object describing a topic value of a topic of the plurality of topics to which the client is subscribed; and
responsive to receiving a changed topic value of the topic within the data structure from the publisher at the data distribution server, publishing a binary delta to the client that represents a difference between the first binary representation and a second binary representation of a second data object describing the changed topic value of the topic,
wherein the client is adapted to:
receive the published binary delta,
calculate the second binary representation from the binary delta and the first binary representation,
generate a structural delta from the first binary representation, the second binary representation, and the binary delta, the structural delta representing a structural difference between data structures of the first text-based object and data structures of the second text-based object, and
determine the changed topic value of the topic from the structural delta.

10. The non-transitory computer-readable storage medium of claim 9, wherein the instructions are executable to perform further operations comprising:
receiving, at the data distribution system server from the client, a subscription to the topic of the plurality of topics; and
updating the data structure describing the plurality of topics responsive to the received subscription.

11. The non-transitory computer-readable storage medium of claim 9, wherein transmitting the first binary representation of the first data object describing the topic value to the client is in response to receiving the subscription to the topic from the client.

12. The non-transitory computer-readable storage medium of claim 9, wherein the instructions are executable to perform further operations comprising:
responsive to receiving the changed topic value of the topic from the publisher at the data distribution server, calculating the binary delta between the changed topic value of the topic and the topic value of the topic.

13. The non-transitory computer-readable storage medium of claim 9, wherein the data structure maintained by the data distribution server comprises a topic tree maintaining topic values for each of the plurality of topics as binary representations, and the instructions are executable to perform further operations comprising:
  updating the topic value of the topic in the topic tree to the changed topic value using the binary delta.

14. The non-transitory computer-readable storage medium of claim 9, wherein maintaining the data structure describing a plurality of topics to which the client can subscribe and the publisher can publish further comprises:
  storing information detailing a most recent binary delta transmitted to the client; and
  storing a most recent binary representation of the topic value of the topic transmitted to the client.

15. The non-transitory computer-readable storage medium of claim 14, wherein a subsequent binary delta published to the client is based on the most recent binary delta and the most recent binary representation of the topic value of the topic transmitted to the client.

16. The non-transitory computer-readable storage medium of claim 9, wherein the instructions are executable to perform further operations comprising:
  receiving, at the data distribution system server from the client, an unsubscription request to the topic of the plurality of topics; and
  wherein responsive to receiving an additional changed topic value of the topic from the publisher at the data distribution server, the data distribution system does not publish a new binary delta to the client that represents a difference between the additional changed topic value of the topic and the changed topic value of the topic.

17. A system for publishing topic updates to a client device, the system comprising:
  a publisher configured to publish topic updates;
  a client configured to subscribe to topic updates; and
  a data distribution server comprising:
    a computer processor; and
    non-transitory computer-readable storage medium storing computer program instructions, the computer program instructions executable by a computer processor to perform operations comprising:
      maintaining, at the data distribution system server, a data structure describing a plurality of topics to which a client can subscribe and a publisher can publish;
      transmitting, to the client from the data distribution system server, a first binary representation of a data object describing a topic value of a topic of the plurality of topics to which the client is subscribed; and
      responsive to receiving a changed topic value of the topic within the data structure from the publisher at the data distribution server, publishing a binary delta to the client that represents a difference between the first binary representation and a second binary representation of a second data object describing the changed topic value of the topic; and
    wherein the client is adapted to:
      receive the published binary delta,
      calculate the second binary representation from the binary delta and the first binary representation,
      generate a structural delta from the first binary representation, the second binary representation, and the binary delta, the structural delta representing a structural difference between data structures of the first text-based object and data structures of the second text-based object, and
      determine the changed topic value of the topic from the structural delta.

18. The system of claim 17, wherein the instructions are executable to perform further operations comprising:
  receiving, at the data distribution system server from the client, a subscription to the topic of the plurality of topics; and
  updating the data structure describing the plurality of topics responsive to the received subscription.

19. The system of claim 17, wherein transmitting the first binary representation of the first data object describing the topic value to the client is in response to receiving the subscription to the topic from the client.

20. The system of claim 17, wherein the instructions are executable to perform further operations comprising:
  responsive to receiving the changed topic value of the topic from the publisher at the data distribution server, calculating the binary delta between the changed topic value of the topic and the topic value of the topic.

* * * * *